(12) United States Patent
Doi

(10) Patent No.: US 10,220,320 B2
(45) Date of Patent: Mar. 5, 2019

(54) VIDEO GAME WITH BOUNDED REGION CAPTURE AND OWNERSHIP VALUE SWAP

(71) Applicant: GREE, Inc., Tokyo (JP)

(72) Inventor: Masayuki Doi, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 15/585,517

(22) Filed: May 3, 2017

(65) Prior Publication Data
US 2018/0001203 A1 Jan. 4, 2018

(30) Foreign Application Priority Data

Jun. 30, 2016 (JP) ................................. 2016-131061

(51) Int. Cl.
| | |
|---|---|
| *A63F 9/24* | (2006.01) |
| *A63F 13/58* | (2014.01) |
| *A63F 13/55* | (2014.01) |
| *A63F 13/822* | (2014.01) |
| *A63F 13/2145* | (2014.01) |
| *A63F 13/25* | (2014.01) |
| *A63F 13/426* | (2014.01) |

(Continued)

(52) U.S. Cl.
CPC .......... *A63F 13/58* (2014.09); *A63F 13/2145* (2014.09); *A63F 13/25* (2014.09); *A63F 13/426* (2014.09); *A63F 13/46* (2014.09); *A63F 13/55* (2014.09); *A63F 13/798* (2014.09); *A63F 13/822* (2014.09); *A63F 13/92* (2014.09)

(58) Field of Classification Search
CPC ......... A63F 13/45; A63F 13/55; A63F 13/822
See application file for complete search history.

(56) References Cited

U.S. PATENT DOCUMENTS

| | | | |
|---|---|---|---|
| 6,189,887 B1 * | 2/2001 | Dommasch | ......... A63F 3/00697 273/236 |
| 7,077,744 B2 * | 7/2006 | Cannon | ................. A63F 13/005 463/16 |

(Continued)

FOREIGN PATENT DOCUMENTS

| | | |
|---|---|---|
| JP | 2014000162 A | 1/2014 |
| JP | 2014046033 A | 3/2014 |

OTHER PUBLICATIONS

Office Action corresponding application No. JP2016-131061 dated Sep. 6, 2016; 13 pgs.

(Continued)

*Primary Examiner* — Lawrence Galka
(74) *Attorney, Agent, or Firm* — Maier & Maier, PLLC

(57) ABSTRACT

A control program for a game device having a storage unit configured to store points associated with players. The game device may receive a request by a player to designate at least a portion of the points associated with the first player as region points of the first player, which may in turn be correlated with a game region designated by the first player. When the first player has the most points for a particular game region, the game region may be set to be a region of the first player. When the first player disposes a first and second game region in a predetermined arrangement, such that the first and second game region has game regions between them, the game regions between the first and second game region may have their point values swapped to put the first player on top.

8 Claims, 22 Drawing Sheets

(51) Int. Cl.
*A63F 13/46* (2014.01)
*A63F 13/798* (2014.01)
*A63F 13/92* (2014.01)

(56) References Cited

U.S. PATENT DOCUMENTS 7,147,556 B1* 12/2006 Harpaz ............... A63F 3/00643
463/9
2014/0066203 A1* 3/2014 Yukishita ................ A63F 13/45
463/31

OTHER PUBLICATIONS

There was never before "3 people match! Reversi" is fun!, URL: http://www.appbank.net/2015/02/19/iphone-application/982476.php, published: Feb. 19, 2015, 14 pgs.

* cited by examiner

FIG.18A

| PLAYER ID | NAME | POSSESSED POINT | ... |
|---|---|---|---|
| Rv514875 | ○○○○ | 495 | ... |
| Rv891254 | △△△△ | 1004 | ... |
| ... | ... | ... | ... |

FIG.18B

| FIELD ID | GAME REGION INFORMATION (REGION ID, POSITION) | ... |
|---|---|---|
| Fd001 | (A001,(1,8)),(A002,(2,1)), (A003,(2,3)),(A004,(2,5)), (A005,(2,7)),(A006,(2,7)), ..., (A025,(7,4)),(A025,(7,6)), | ... |
| Fd002 | (A001,(1,2)),(A002,(1,8)), (A003,(1,10)),... | ... |
| ... | ... | ... |

FIG.19A

| GAME ID | FIELD ID | PARTICIPATED PLAYER INFORMATION (FIRST PLAYER ID, SECOND PLAYER ID, ...) | ... |
|---|---|---|---|
| S0001 | Fd001 | (Rv514875,Rv225689,...) | ... |
| S0002 | Fd024 | (Rv891254,Rv652365,...) | ... |
| ... | ... | ... | ... |

FIG.19B

| REGION ID | REGION POINT INFORMATION (FIRST PLAYER, SECOND PLAYER, ...) | ... |
|---|---|---|
| A001 | (30,20,...) | ... |
| A002 | (0,0,...) | ... |
| ... | ... | ... |

VIDEO GAME WITH BOUNDED REGION CAPTURE AND OWNERSHIP VALUE SWAP

BACKGROUND OF THE INVENTION

Field of the Invention

The present invention relates to a control program, a control method, and a game device.

Background Art

A domination game in which a plurality of players respectively occupies a plurality of territories included in a game field and deprives a territory of other players is known. In such a domination game, a game in which a player correlates the owned point (which may be virtual currency and the like) or the owned character, with a territory, and the player competes with another player for the territory, in accordance with the amount of points or the strength of the character correlated with the territory may be performed.

For example, JP-A-2014-73164 discloses a game program for realizing a domination game in which a competition may be executed between players who respectively own territories, and the territory owned by the player losing in the competition may be ceded to the player winning in the competition.

SUMMARY OF THE INVENTION

However, in the domination game of the related art, it may be determined whether or not the territory of a player can be acquired, based on the amount of owned points, the strength of the owned character of the player, and the like. Thus, it may not be possible for a player to progress the game by using a strategy. In addition, a player can easily predict a game result based on the amount of points owned by the player, the strength of the owned character of the player, and the like, which may reduce the will of the player to continuously play the game.

To solve the above problem, according to an exemplary embodiment, a control program, a control method, and a game device which can realize a game which requires a strategy of a player, which can thereby improve the player's interest in the game may be provided.

According to an exemplary embodiment, there may be provided a control program of a game device which includes a storage unit and progresses a game by using a game field including a plurality of game regions. The control program may cause the game device to execute: storing, in the storage unit, points which are respectively associated with a plurality of players; correlating at least a portion of the points associated with a first player with a game region designated by the first player among the plurality of game regions in accordance with a request of the first player, and designating these correlated points as region points of the first player; setting the game region correlated with the region points of the first player to be a corresponding region of the first player in a case where the region points of the first player are greater than the region points of a player different from the first player in the game region correlated with the region points of the first player; in a case where game regions (between the corresponding region of the first player, which is set, and another corresponding region of the first player, which has been previously set) are disposed in predetermined arrangement, and all of the game regions disposed in the predetermined arrangement are corresponding regions of a player different from the first player, extracting region points of the first player correlated with the game regions disposed in the predetermined arrangement, and region points of the player who has the game regions as the corresponding regions; and correlating the extracted region points of the player, as the region points of the first player, with the game regions disposed in the predetermined arrangement, and setting the game regions disposed in the predetermined arrangement, to be corresponding regions of the first player in a case where the region points of the first player are larger than the region points of the player, which have been correlated with the game regions, in the game regions disposed in the predetermined arrangement.

In the control program according to an exemplary embodiment, the game device may cause the extracted region points of the first player to be correlated, as the region points of the player who has the game regions as the corresponding regions, with the game regions disposed in the predetermined arrangement.

In the control program according to an exemplary embodiment, in a case where the first player designates a first specific region from the plurality of game regions when the region points are correlated in accordance with a request of the first player, a predetermined point value and the points correlated as the region points may be consumed from the points stored in the storage unit.

In the control program according to an exemplary embodiment, the game field may include a restricted region of which designation by a player may not be possible, and the restricted region may be changed to a game region depending on the number of times region points are correlated according to the request of the first player.

In the control program according to an exemplary embodiment, i the game device may be caused to execute a process which may include specifying color information associated with the first player in the corresponding region of the first player, changing brightness, chroma, or hue of the specified color information, based on both or any one of the region point of the first player and the region point of another player, which may be correlated with the corresponding region of the first player, and displaying the corresponding region of the first player with the changed color information.

According to another exemplary embodiment, there may be provided a control program of a game device which may include a storage unit and may progress a game by using a game field including a plurality of game regions. The control program may cause the game device to execute: storing points which may be respectively associated with a plurality of players, in the storage unit; correlating at least a portion of the points associated with a first player, as region points of the first player, with a game region designated by the first player among the plurality of game regions in accordance with a request of the first player; setting the game region correlated with the region points of the first player to be a corresponding region of a first group, in a case where a summation value of region points of players included in the first group to which the first player belongs is larger than a summation value of region points of players included in a group different from the first group, in the game region correlated with the region point of the first player; in a case where game regions between the corresponding region of the first group which may be set, and another corresponding region of the first group, which has been previously set are disposed in a predetermined arrangement, and all of the game regions disposed in the predetermined arrangement may be corresponding regions of a second group different from the first group, extracting region points of the first group correlated with the game regions disposed in the predetermined arrangement, and region points of the second group who has the game regions as the corresponding regions; and correlating the extracted region points of the group, as the region points of the first group, with the game regions disposed in the predetermined arrangement, and setting the game regions disposed in the predetermined arrangement, to be corresponding regions of the first group in a case where the region points of the first group are larger than the region points of the second group, in the game regions disposed in the predetermined arrangement.

In the control program according to another exemplary embodiment, the game device may be caused to execute a process which may include calculating a summation value of region points correlated by each player, for each of the players included in the first group, and storing a player reward depending on the calculated summation value, in the storage unit in association with each player; and storing a group reward depending on a summation value of region points of the first group, which may be correlated with corresponding regions of the first group, in the storage unit in association with each of the players included in the first group.

According to still another exemplary embodiment, there may be provided a control method of a game device which may include a storage unit and may progress a game by using a game field including a plurality of game regions. The control method may include storing points which may be respectively associated with a plurality of players, in the storage unit; correlating at least a portion of the points associated with a first player, as region points of the first player, with a game region designated by the first player among the plurality of game regions in accordance with a request of the first player; setting the game region correlated with the region points of the first player to be a corresponding region of the first player in a case where the region points of the first player are larger than the region points of a player different from the first player in the game region correlated with the region points of the first player; in a case where game regions between the corresponding region of the first player which may be set, and another corresponding region of the first player, which has been previously set are disposed in predetermined arrangement, and all of the game regions disposed in the predetermined arrangement may be corresponding regions of a player different from the first player, extracting region points of the first player correlated with the game regions disposed in the predetermined arrangement, and region points of the player who has the game regions as the corresponding regions; and correlating the extracted region points of the player, as the region points of the first player, with the game regions disposed in the predetermined arrangement, and setting the game regions disposed in the predetermined arrangement, to be corresponding regions of the first player in a case where the region points of the first player may be larger than the region points of the player, which have been correlated with the game regions, in the game regions disposed in the predetermined arrangement.

According to still another exemplary embodiment, there may be provided a game device which may progress a game by using a game field including a plurality of game regions. The game device may include a storage unit that stores points which may be respectively associated with a plurality of players; a correlation unit that correlates (i.e. links/associates/stores) at least a portion of the points associated with a first player, as region points of the first player, with a game region designated by the first player among the plurality of game regions in accordance with a request of the first player; and a setting unit that sets the game region correlated with the region points of the first player, to be a corresponding region of the first player in a case where the region point of the first player is larger than a region point of a player different from the first player in the game region correlated with the region point of the first player. In a case where game regions between the corresponding region of the first player which may be set, and another corresponding region of the first player, which has been previously set may be disposed in predetermined arrangement, and all of the game region disposed in the predetermined arrangement may be corresponding regions of a player different from the first player, the correlation unit may extract region points of the first player correlated with the game regions disposed in the predetermined arrangement, and region points of the player who has the game regions as the corresponding regions, and may correlate the extracted region points of the player, as the region points of the first player, with the game regions disposed in the predetermined arrangement. The setting unit may set the game regions disposed in the predetermined arrangement, to be corresponding regions of the first player in a case where the region points of the first player may be larger than the region points of the player, which have been correlated with the game regions, in the game regions disposed in the predetermined arrangement.

According to the control program, the control method, and the game device of the invention, it may be possible to realize a game requiring the player to exercise a strategy, which may thus improve the player's interest in the game.

BRIEF DESCRIPTION OF THE DRAWINGS

FIGS. 18A and 18B are diagrams illustrating an example of data structures of various tables.

FIGS. 19A and 19B are diagrams illustrating an example of data structures of various tables.

DETAILED DESCRIPTION OF THE INVENTION

Hereinafter, various exemplary embodiments will be described with reference to the drawings. It may not beed that the technical range of the present invention may not be limited to the exemplary embodiments described herein, and the exemplary embodiments described in claims and equivalents thereof may be included.

Outline of Game

Figure 1A:
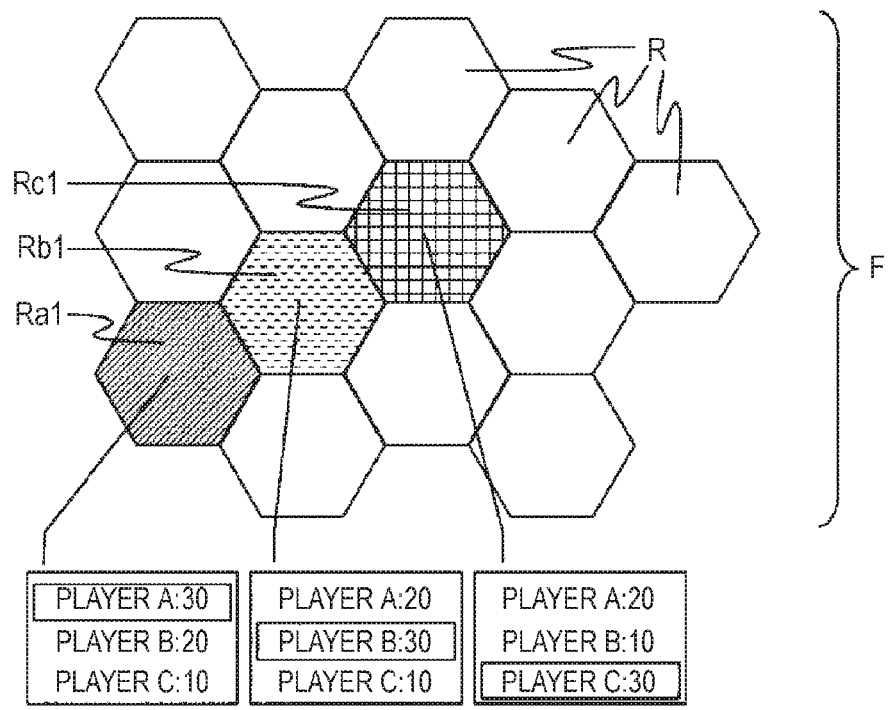
FIGS. 1A and 1B are diagrams illustrating an example of a game provided by a game device.
Figure 1B:
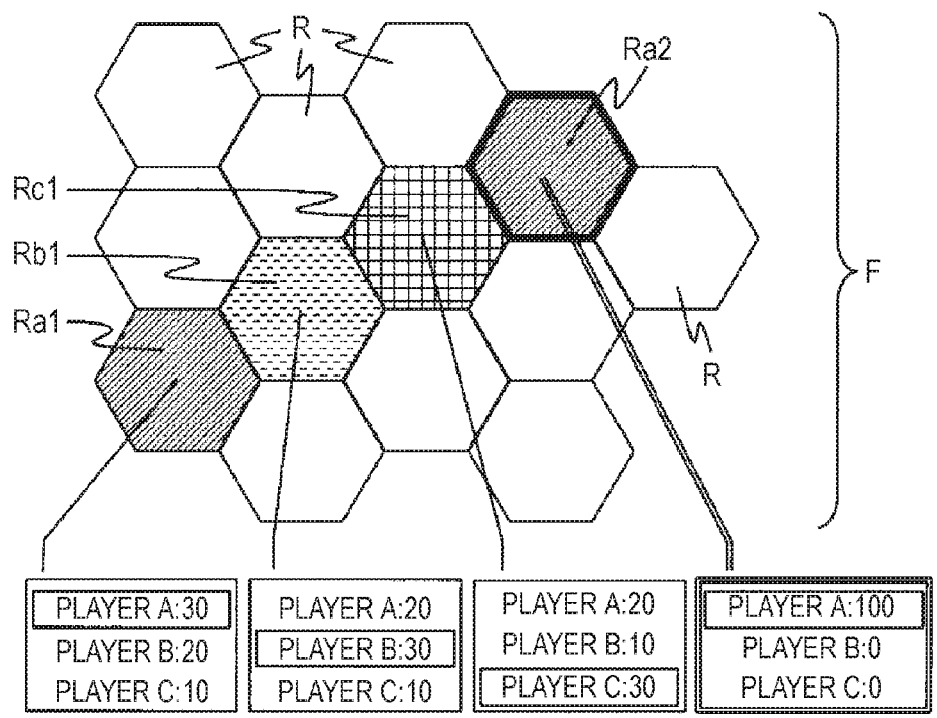
Figure 2:
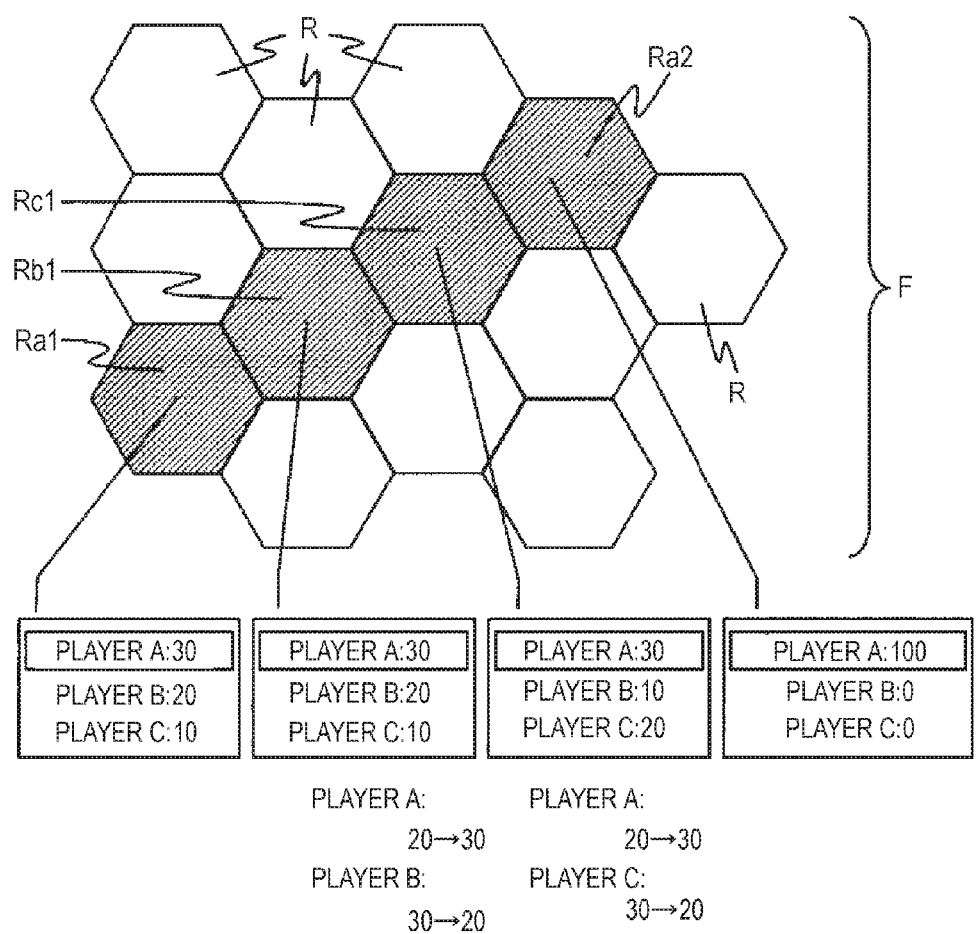
FIG. 2 is a diagram illustrating another example of the game provided by the game device.

FIGS. 1A to 2 may be diagrams illustrating an example of a game that may be provided by a game device. An example of a game provided by a game device according to an embodiment will be described below with reference to FIGS. 1A to 2.

In an exemplary embodiment, a player may progress a game in which a game region may be correlated with a player, by operating the game device that displays a game field including a plurality of game regions on a display screen, so as to designate the game region. The game region may be a predetermined closed region which may be displayed on the display screen and may be designated by an input of a player. A game object, such as a panel, a card, or a character, may be used instead of the game region. The game field may be a game space which may be displayed on the display screen and may be used for disposing a plurality of game regions. As an example, a domination game in which a plurality of players (player A, player B, and player C) participate, which may be a game progressed by the game device, will be described below.

As illustrated in FIGS. 1A to 2, a game field F including a plurality of game regions R may be displayed on the display screen of the game device, and the game device may cause the domination game using the displayed game field F to progress. Each of the plurality of players participating in the domination game may have a number of owned points. The owned points correspond to numerical information of virtual currency, game execution points, and the like. In a case where a predetermined condition may be satisfied in the game, the owned points may be stored by the game device, associated with the player. For example, in a case where it is determined that the game may be started, in a case where it is determined that a predetermined period elapses from the start of the game, or in a case where a progress state of the game coincides with a specific situation, the owned points may be stored in association with the player. The case where a progress state of the game coincides with a specific situation refers to a case where a specific game region R may be set as a corresponding region of a player, which will be described later, a case where the number of corresponding regions of a player reaches a predetermined value, a case where the number of times of a game region R being designated by a player reaches a predetermined value, or the like. In this case, region points of a player and/or points of a value corresponding to the region points of another player in the corresponding region may be given to the player as owned points.

Each of the plurality of players participating in the domination game may designate a game region R included in the displayed game field F, in a predetermined order. The predetermined order may be referred to as an input operation order below. A player who performs an input operation in the input operation order may be an example of a first player. The game device may receive a request of a player, which may include information indicating a game region R which has been designated by the player. The game device may correlate a portion of the owned points associated with the player, with the game region R designated by the player, in accordance with the received request of the player. The owned points of one or each of the plurality of players who respectively designate game regions R may be associated with the corresponding game region R. The owned points correlated with the game region R may be referred to as region points below.

In a case where the region points may be correlated with the game region R by the request of the player, the game device may determine whether or not the region points of the player, which may be correlated with the game region R may be larger than the region points of another player, which may be correlated with the game region R. In a case where the game device determines that the region points of the player, which may be correlated with the game region R are larger than the region points of another player, which may be correlated with the game region R, the game device may set the game region R to be a corresponding region of the player. In this manner, the game device sets each of the plurality of game regions R to be a corresponding region of the player which may be correlated with the largest value of region points among region points correlated with the game region R.

In the example of the game field F illustrated in FIG. 1A, 30 points, 20 points, and 10 points may be correlated with a game region Ra1, as the region points of a first player, player A, a second player, player B, and a third player, player C, respectively. 20 points, 30 points, and 10 points may be correlated with a game region Rb1, as the region points of player A, player B, and player C, respectively. 20 points, 10 points, and 30 points may be correlated with a game region Rc1, as the region points of player A, player B, and player C, respectively.

Players correlated with the region point having the largest value among the region points which may be respectively correlated with the game region Ra1, the game region Rb1, and the game region Rc1 may be player A, player B, and player C. Thus, the game region Ra1 may be set as the corresponding region of player A, the game region Rb1 may be set as the corresponding region of player B, and the game region Rc1 may be set as the corresponding region of player C.

FIG. 1B illustrates a case where 100 points of the owned points of player A may be correlated with a game region Ra2, as region points. The game region Ra2 has not been designated by player A, player B, and player C before. Thus, before player A correlates the region points of 100 points with the game region Ra2, 0 points have been correlated with the game region Ra2, as the region points of player A, player B, and player C, respectively. However, at this time, the region point of 100 points may be correlated with game region Ra2 by player A. Thus, the game region Ra2 may be set as the corresponding region of player A, who correlates the region point having the largest value with the game region Ra2.

An example of region points changing processing executed by the game device in a case where the game region Ra2 may be set as the corresponding region of player A will be described below.

Firstly, the game device may specify the corresponding region Ra1 of player A, which has been previously set and may be different from the corresponding region Ra2 of player A, which may be set this time. Then, the game device may determine whether or not one or a plurality of game regions R (in FIG. 1B, Rb1 and Rc1) between the corresponding region Ra2 of player A which may be set, and the specified corresponding region Ra1 of player A may be disposed in a predetermined arrangement. The predetermined arrangement may be an arrangement of game regions R on a predetermined line which has end points in the corresponding region Ra2 of player A, which may be set this time, and in the corresponding region Ra1 of player A, which has been previously set. The predetermined line may have a shape of a straight line, a polygonal line, a curved line, or the like.

In a case where the game device determines that the game regions Rb1 and Rc1 are disposed in the predetermined arrangement, the game device may determine whether or not all of the determined game regions Rb1 and Rc1 maybe corresponding regions of another player who may be different from player A. Then, in a case where the game device determines that all of the game regions Rb1 and Rc1 are the corresponding regions of the other player, the game device may extract region points of player A correlated with the game regions Rb1 and Rc1, and region points of the other player who has the game regions Rb1 and Rc1 as the corresponding regions.

In the example of the game field F illustrated in FIG. 2, the region points (20 points) of player A, which may be correlated with the game region Rb1, and the region points (30 points) of player B who has the game region Rb1 as the corresponding region may be extracted. The region points (20 points) of player A, which may be correlated with the game region Rc1, and the region points (30 points) of player C who has the game region Rc1 as the corresponding region may be extracted.

Regarding the game region Rb1, the game device may replaces the extracted region points of player A with the extracted region points of player B, and correlates the replaced region points with the game region Rb1. That is, regarding the game region Rb1, the game device correlates the extracted region points (30 points) of player B, with the game region Rb1, as the region points of player A. In addition, regarding the game region Rb1, the game device correlates the extracted region points (20 points) of player A with the game region Rb1, as the region points of player B.

Similarly, regarding the game region Rc1, the game device replaces the extracted region points of player A with the extracted region points of player C, and correlates the replaced region points with the game region Rc1. That is, regarding the game region Rc1, the game device correlates the extracted region points (30 points) of player C, with the game region Rc1, as the region points of player A. In addition, regarding the game region Rc1, the game device correlates the extracted region points (20 points) of player A with the game region Rc1, as the region points of player C.

According to an exemplary embodiment, the region points of player A may thus become larger than the region points of another player, in the game region R having the changed region point values, and as such the game device may set the game region R as the corresponding region of player A. In the example of the game field F illustrated in FIG. 2, the region points (30 points) of player A, which may be correlated with the game region Rb1 may be larger than the region points of player B and player C, which may be correlated with the game region Rb1. Thus, the game device sets the game region Rb1 as the corresponding region of player A. The region points (30 points) of player A, which may be correlated with the game region Rc1 may be larger than the region points of player B and player C, which may be correlated with the game region Rc1. Thus, the game device may set the game region Rc1 as the corresponding region of player A. A game region R (in the example illustrated in FIG. 2, game regions Rb1 and Rc1) as a target of the region-point changing processing may be referred to as a point-change target region below.

Hitherto, the descriptions may be made with reference to FIGS. 1A to 2. In the above-described game device and a control method of the game device, the region-point changing processing may be performed in the domination game. Thus, a player can receive the region points of another player, which may be correlated with a game region R, as the region points of the player, without an operation of designating the game region R. In this manner, it may be possible to realize a domination game requiring a strategy of a player, which may therefore improve the interest in the game by the game device performing the region-point changing processing, and by the control method of the game device. A player who has the largest total amount of the region points when the game may be ended, or has the largest number of corresponding regions may be determined to be the winning player.

The above descriptions of FIGS. 1A to 2 may be just descriptions for better understanding the details of the present invention. The present invention may be implemented in embodiments which will be described below, and may be implemented in various modification examples in a range without departing from the gist of the present invention. All of such modification examples may be included in the disclosure scope of the present invention and this specification.

Configuration of Game System 1

Figure 3:
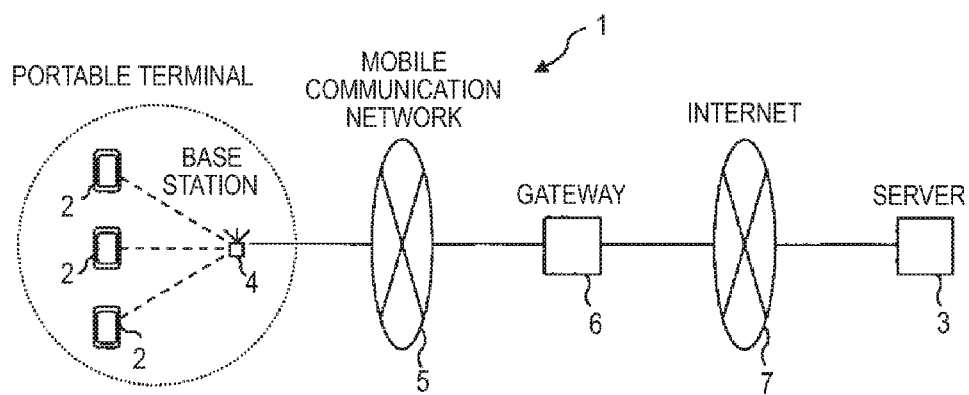
FIG. 3 is a diagram illustrating an example of a schematic configuration of a game system.

FIG. 3 may be a diagram illustrating an example of a schematic configuration of the game system 1.

The game system 1 may include a server 3 and a plurality of portable terminals 2 which may be respectively operated by a plurality of players. The portable terminal 2 and the server 3 may be connected to each other through, for example, a communication network such as a base station 4, mobile communication network 5, a gateway 6, and the Internet 7. A program (for example, a display processing program) executed in the portable terminal 2 and a program (for example, a region-point changing processing program) executed in the server 3 may communicate with each other by using a communication protocol such as the Hypertext Transfer Protocol (HTTP). The server 3 may be an example of the game device. The game device may not be limited to the server 3. A portable terminal 2 which has some or all of functions of the server 3, which will be described later may be used as the game device. The game system 1 including the portable terminal 2 and the server 3 may be used as the game device.

A multi-function portable phone (so-called a "smart phone") may be used as the portable terminal 2, but the present invention may not be limited thereto. As the portable terminal 2, any device may be provided as long as the present invention can be applied. For example, an information processing device such as a portable phone (a so-called "feature phone"), a portable information terminal (personal digital assistant, PDA), a portable game machine, a portable audio player, a tablet terminal, a tablet PC, and a notebook PC may be provided.

Configuration of Portable Terminal 2

Figure 4:
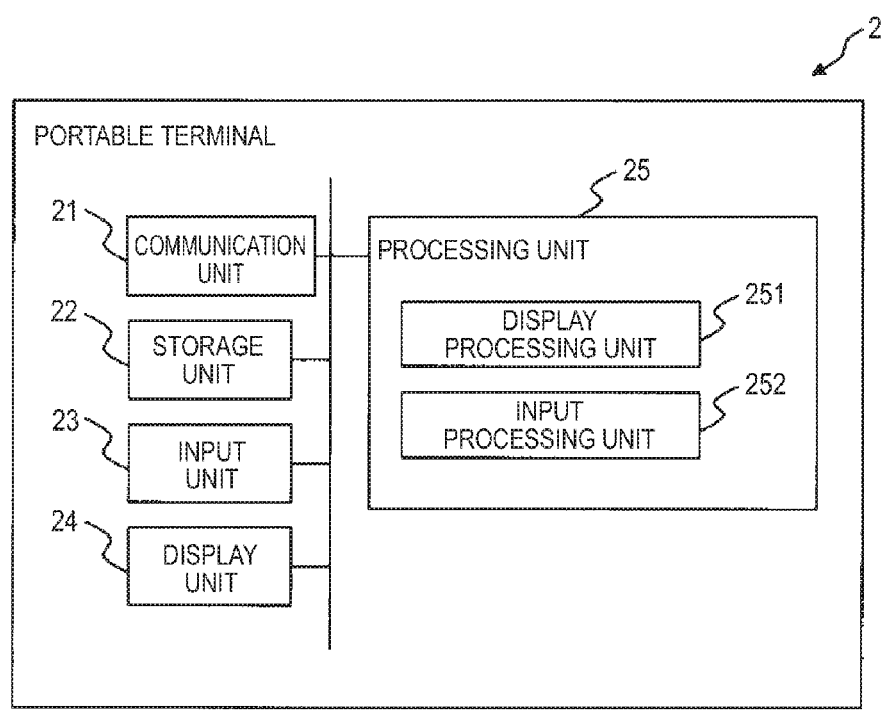
FIG. 4 is a diagram illustrating an example of a schematic configuration of a portable terminal.

FIG. 4 may be a diagram illustrating an example of a schematic configuration of the portable terminal 2.

The portable terminal 2 may execute a game such as the domination game, and may be connected to the server 3 through the base station 4, the mobile communication network 5, the gateway 6, and the Internet 7, so as to communicate with the server 3. The portable terminal 2 may control the progress of a game in accordance with an operation of an input unit (touch panel and the like) 23 by a player. The portable terminal 2 may receive various types of data from the server 3, and may control the progress of the game. For this, the portable terminal 2 may include a communication unit 21, a storage unit 22, the input unit 23, a display unit 24, and a processing unit 25.

The communication unit 21 may include a communication interface circuit which may include an antenna having a predetermined frequency band as a reception band. The communication unit 21 may connect the portable terminal 2 to a wireless communication network. The communication unit 21 may establish a wireless signal line by the code division multiple access (CDMA) scheme and the like, between the portable terminal 2 and the base station 4 through a channel allocated by the base station 4. Thus, the communication unit 21 may communicate with the base station 4. The communication unit 21 may transmit data supplied from the processing unit 25 to the server 3 and the like. The communication unit 21 may supply data received from the server 3 and the like to the processing unit 25.

The storage unit 22 may include a semiconductor memory device, for example. The storage unit 22 may store an operating system program, a driver program, an application program including a game control program, data, and the like which may be used when the processing unit 25 performs processing. For example, the storage unit 22 may store an input device driver program for controlling the input unit 23, an output device driver program for controlling the display unit 24, and the like, as the driver program. The storage unit 22 may store a display processing program and the like for progressing the game based on instruction data, data retrieved from the server 3, and the like, and displaying display data relating to the progress of the game, as the application program. The instruction data may be input by a player operating the input unit 23. The storage unit 22 may store data retrieved from the server 3, display data relating to the progress of the game, video data, image data, and the like, as the data. Further, the storage unit 22 may temporarily store temporary data relating to predetermined processing.

The input unit 23 may be any device as long as the device enables an operation for the portable terminal 2. For example, a pointing device such as a touch panel may be provided. A player can input a character, a number, a symbol, and the like by using the input unit 23. If the input unit 23 is operated by a player, the input unit 23 may generate a signal corresponding to the operation. The generated signal may be supplied to the processing unit 25 in accordance with an instruction of the player.

The display unit 24 may be also any device as long as the device enables display of a video, an image, and the like. For example, a liquid crystal display or an organic electroluminescence (EL) device may be provided. The display unit 24 may display a video corresponding to video data supplied from the processing unit 25 or may display an image and the like corresponding to image data supplied from the processing unit 25.

The processing unit 25 may include one or a plurality of processors and a peripheral circuit. The processing unit 25 may collectively control the overall operation of the portable terminal 2, and may be a central processing unit (CPU), for example. The processing unit 25 may control operations of the communication unit 21, the display unit 24, and the like, so as to perform various types of processing of the portable terminal 2 in appropriate procedures, based on the program stored in the storage unit 22, an operation of the input unit 23, and the like. The processing unit 25 may perform processing based on the program (operating system program, driver program, application program, and the like) stored in the storage unit 22. The processing unit 25 can perform a plurality of programs (application programs and the like) in parallel.

The processing unit 25 may include at least a display processing unit 251 and an input processing unit 252. The units may be functional modules realized by a program which maybe executed by a processor included in the processing unit 25. In addition, the units may be mounted as a firmware in the portable terminal 2.

An example of a game screen will be described below with reference to FIGS. 5A to 9B. The game screen may be displayed in display units 24 of a portable terminal 2a, a portable terminal 2b, and a portable terminal 2c which may be respectively held by player A, player B, and player C who participate in the game.

Figure 5A:
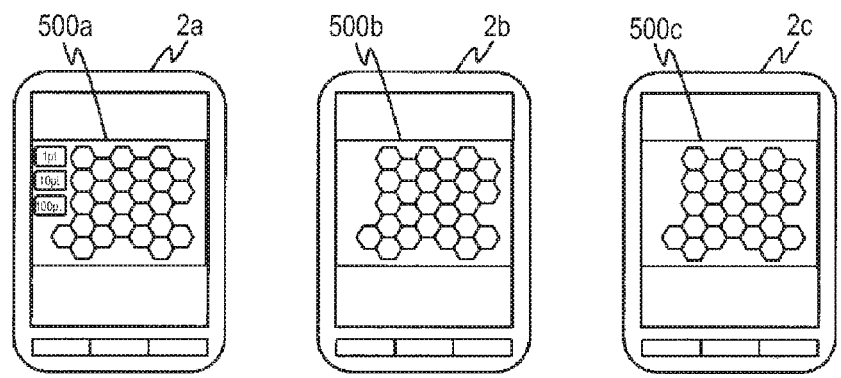
FIGS. 5A and 5B are diagrams illustrating an example of a game screen displayed by the portable terminal.

FIG. 5A may be a diagram illustrating an example of game screens 500a, 500b, and 500c which may be respectively displayed in display units 24 of the portable terminal 2a, the portable terminal 2b, and the portable terminal 2c.

If the game is started, firstly, the portable terminal 2a displays a game screen 500a for causing player A to designate a game region R included in the game field F, in the display unit 24. The portable terminal 2b and the portable terminal 2c may respectively display a game screen 500b and a game screen 500c for browsing the game field F, in the display units 24 during a period when the game screen 500a may be displayed in the display unit 24 of the portable terminal 2a. A period when the game screen for designating a game region R may be displayed in the display unit 24 of the portable terminal 2 may be referred to as an operable period below.

Figure 5B:
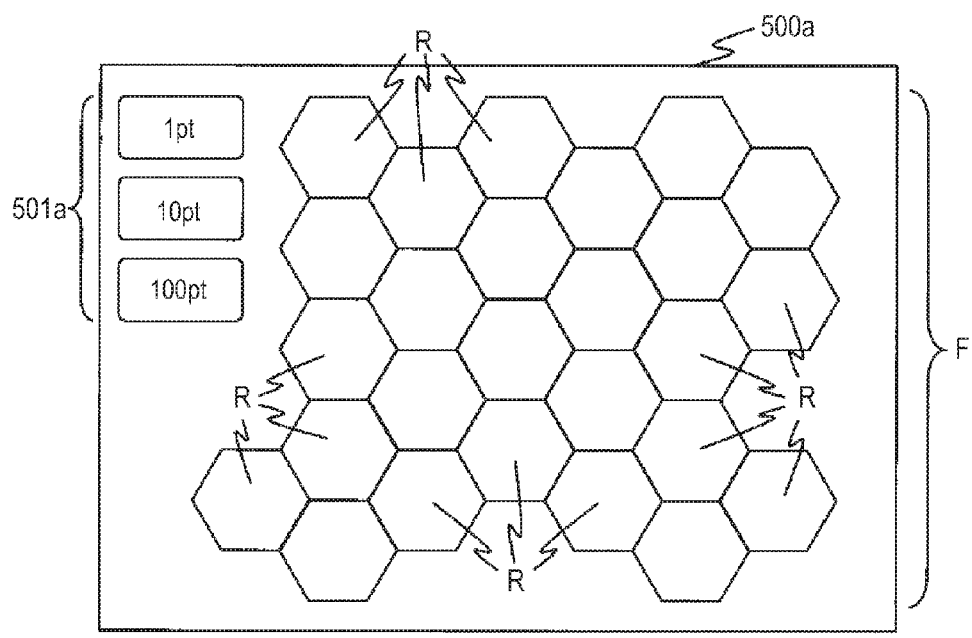

FIG. 5B may be a diagram illustrating an example of the game screen 500a displayed in the display unit 24 of the portable terminal 2a.

The game field F and a region-point designation button 501a which may be operation targets of player A may be displayed on the game screen 500a. The region-point designation button 501a may be a button for designating a unit point of the owned points correlated with a game region R, from the owned points associated with player A. For example, in the example of the game screen 500a illustrated in FIG. 5B, a region-point designation button for one point, a region-point designation button for 10 points, and a region-point designation button for 100 points may be displayed as the region-point designation button 501a. An example of an operation method of a player for correlating at least a portion of the owned points associated with player A, with a game region R as region points of the game region R will be described below with reference to FIGS. 6A and 6B.

Figure 6A:
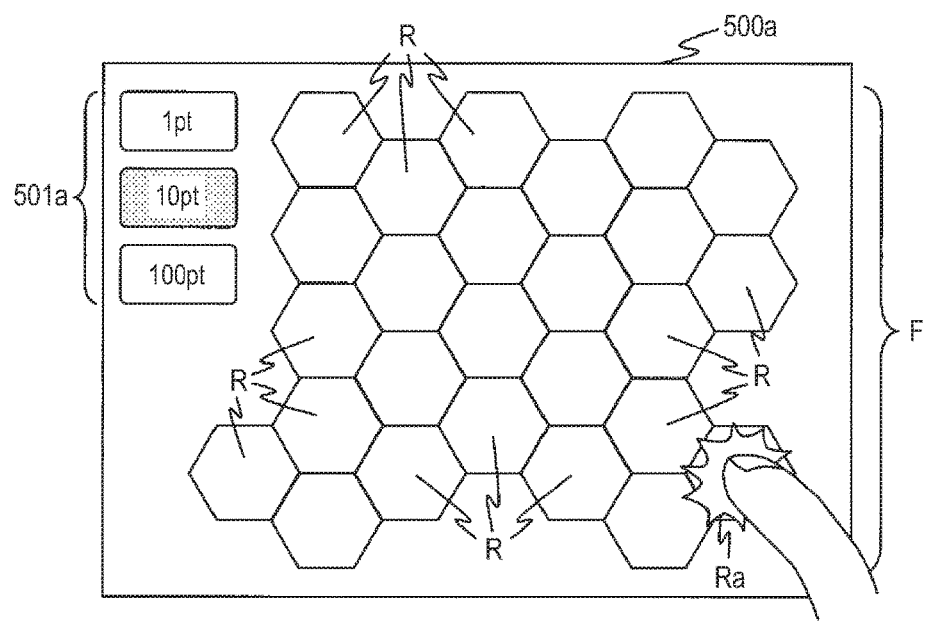
FIGS. 6A and 6B are diagrams illustrating another example of the game screen displayed by the portable terminal.

As illustrated in FIG. 6A, in a case where 30 points of the owned point associated with player A may be correlated with a desired game region Ra, for example, player A may designate the region-point designation button 501a for 10 points, and may designate the desired game region Ra three times. For example, in a case where player A may cause a region point of five points to be correlated with the desired game region Ra, player A may designate the region-point designation button 501a for one point, and may designate the desired game region Ra five times. For example, in a case where player A may cause a region point of 200 points to be correlated with the desired game region Ra, player A may designate the region-point designation button 501a for 100 points, and may designate the desired game region Ra two times. Player A may designate a plurality of game regions Ra for the operable period.

Figure 6B:
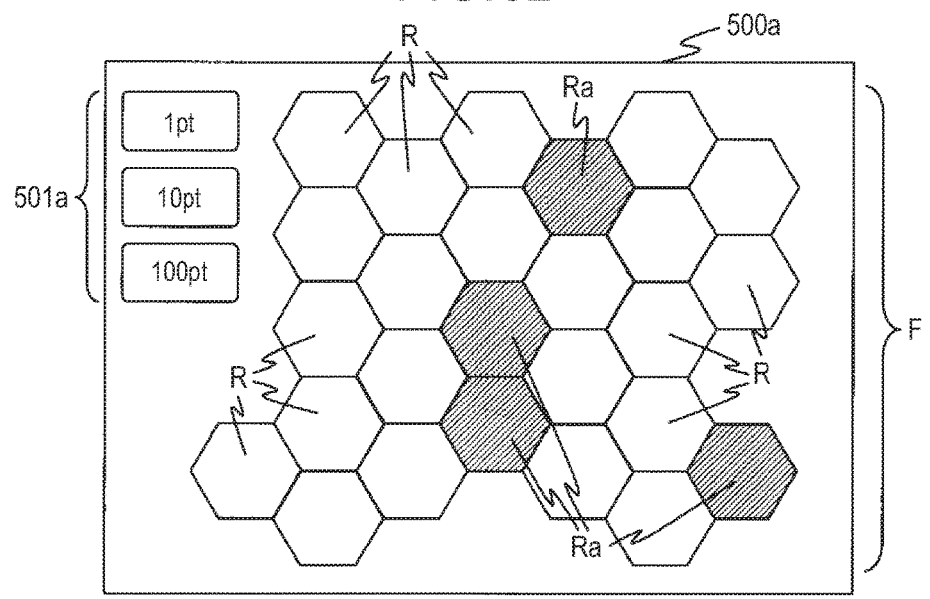

In the example of the game screen 500a illustrated in FIG. 6B, the region points may be respectively correlated with four game regions Ra by player A. Because the region points having the largest value may be correlated with the four game regions Ra by player A, the four game regions Ra may be set as the corresponding regions of player A. The corresponding region Ra of player A may be displayed based on predetermined color information associated with player A, so as to enable the region Ra to be distinguished from other game regions R.

The game field F displayed on the game screen 500a illustrated in FIGS. 5B, 6A, and 6B may be displayed on the game screens 500b and 500c which may be respectively displayed in the display units 24 of the portable terminals 2b and 2c, so as to be browsable. The region-point designation button 501a may not be displayed on the game screens 500b and 500c which may be respectively displayed in the display units 24 of the portable terminals 2b and 2c, and the game screens 500b and 500c may be controlled to cause the game region Ra not to be designated by the players B and C.

Figure 7A:
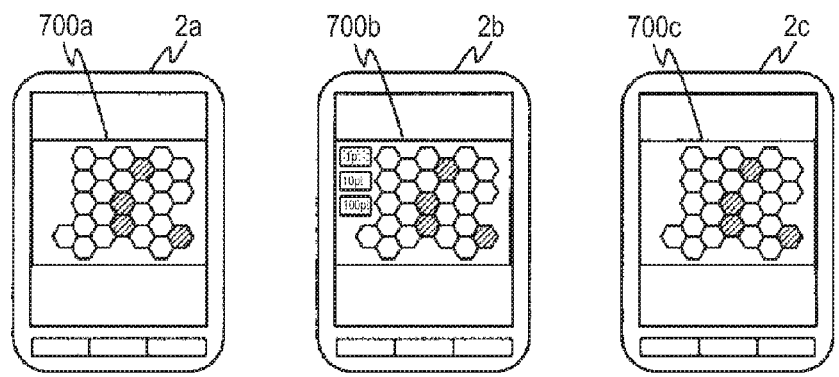
FIGS. 7A and 7B are diagrams illustrating an example of a game screen displayed by the portable terminal.

FIG. 7A may be a diagram illustrating an example of game screens 700a, 700b, and 700c which may be respectively displayed in the display units 24 of the portable terminals 2a, 2b, and 2c when a predetermined operable period from when the game screen 500a may be displayed in the display unit 24 of the portable terminal 2a may be ended.

When the predetermined operable period from when the game screen 500a may be displayed in the display unit 24 of the portable terminal 2a may be ended, the portable terminal 2b may display the game screen 700b in the display unit 24. The game screen 700b may be used for causing player B to designate a game region R included in the game field F. The portable terminals 2a and 2c may respectively display the game screens 700a and 700c for browsing the game field F, in the display units 24 during an operable period when the game screen 700b may be displayed in the display unit 24 of the portable terminal 2b.

Figure 7B:
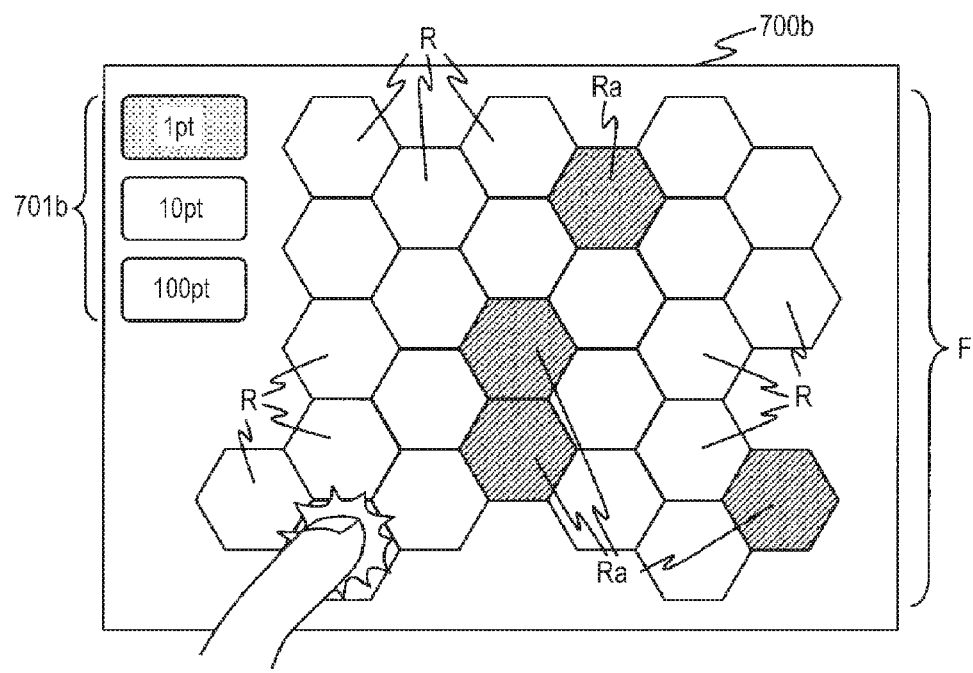

FIG. 7B may be a diagram illustrating an example of the game screen 700b displayed in the display unit 24 of the portable terminal 2b.

The game field F and a region-point designation button 701b which may be operation targets of player B may be displayed on the game screen 700b. The corresponding region Ra of player A which has been set before the game screen 700b may be displayed (when the previous operable period may be ended) may be displayed in the game field F. Player B may designate the region-point designation button 701b, so as to designate a desired game region R. Thus, player B correlates at least a portion of the owned points associated with player B, with the desired game region R, as the region points. Player B may correlate the region points with the corresponding region Ra of player A.

The game field F displayed on the game screen 700b illustrated in FIG. 7B may be displayed on the game screens 700a and 700c which may be respectively displayed in the display units 24 of the portable terminals 2a and 2c, so as to be browsable. The region-point designation button 701b may not be displayed on the game screens 700a and 700c which may be respectively displayed in the display units 24 of the portable terminals 2a and 2c, and the game screens 700a and 700c may be controlled to cause the game region Ra not to be designated by the players A and C.

Figure 8A:
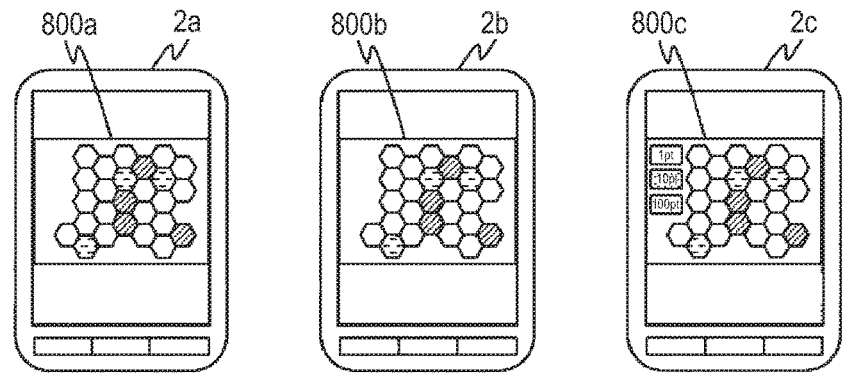
FIGS. 8A and 8B are diagrams illustrating an example of a game screen displayed by the portable terminal.

FIG. 8A may be a diagram illustrating an example of game screens 800a, 800b, and 800c which may be respectively displayed in the display units 24 of the portable terminals 2a, 2b, and 2c when a predetermined operable period from when the game screen 700b may be displayed in the display unit 24 of the portable terminal 2b may be ended.

When the predetermined operable period from when the game screen 700b may be displayed in the display unit 24 of the portable terminal 2b is ended, the portable terminal 2c may display the game screen 800c in the display unit 24. The game screen 800c may be used for causing player C to designate a game region R included in the game field F. The portable terminals 2a and 2b may respectively display the game screens 800a and 800b for browsing the game field F, in the display units 24 during an operable period when the game screen 800c may be displayed in the display unit 24 of the portable terminal 2c.

Figure 8B:
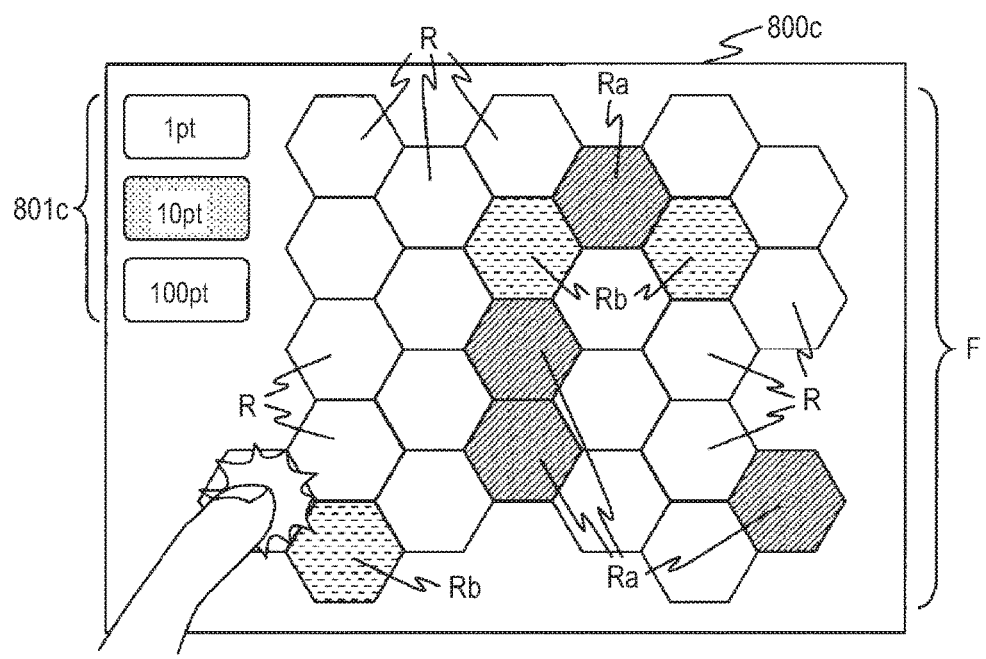

FIG. 8B may be a diagram illustrating an example of the game screen 800c displayed in the display unit 24 of the portable terminal 2c.

The game field F and a region-point designation button 801c which may be operation targets of player C may be displayed on the game screen 800c. The corresponding region Ra of player A and the corresponding region Rb of player B which have been set before the game screen 800c may be displayed (when the previous operable period may be ended) may be displayed in the game field F. The corresponding region Rb of player B may be displayed based on predetermined color information associated with player B, so as to enable the region Rb to be distinguished from other game regions R and the corresponding region Ra of player A. Player C may designate the region-point designation button 801c, so as to designate a desired game region R. Thus, player C may correlate at least a portion of the owned points associated with player C, with the desired game region R, as region points. Player C may correlate the region point with the corresponding region Ra of player A and the corresponding region Rb of player B.

The game field F displayed on the game screen 800c illustrated in FIG. 8B may be displayed on the game screens 800a and 800b which may be respectively displayed in the display units 24 of the portable terminals 2a and 2b, so as to be browsable. The region-point designation button 801c may not be displayed on the game screens 800a and 800b which may be respectively displayed in the display units 24 of the portable terminals 2a and 2b, and the game screens 700a and 700c may be controlled to cause the game region Ra not to be designated by the players A and B.

Figure 9A:
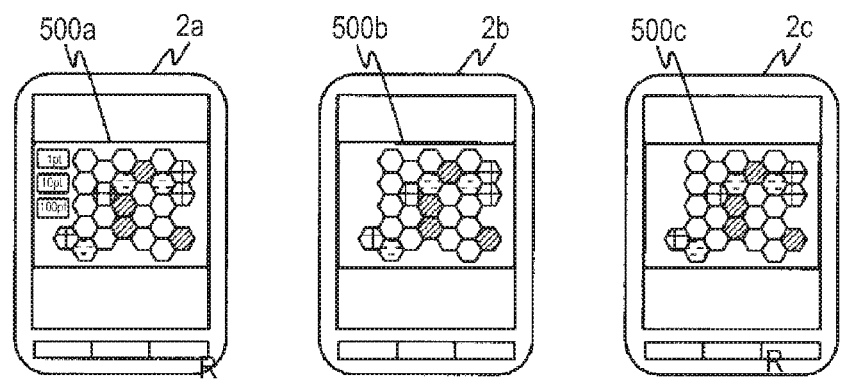
FIGS. 9A and 9B are diagrams illustrating still another example of the game screen displayed by the portable terminal.

FIG. 9A may be a diagram illustrating an example of the game screens 500a, 500b, and 500c which may be respectively displayed in the display units 24 of the portable terminals 2a, 2b, and 2c when a predetermined operable period, from when the game screen 800c may be displayed in the display unit 24 of the portable terminal 2c, may be ended.

When the predetermined operable period from when the game screen 800c may be displayed in the display unit 24 of the portable terminal 2c may be ended, the portable terminal 2a displays the game screen 500a for causing player A to designate a game region R included in the game field F again, in the display unit 24. The portable terminals 2b and 2c may respectively display the game screens 500b and 500c for browsing the game field F, in the display units 24 during an operable period when the game screen 500a may be displayed in the display unit 24 of the portable terminal 2a.

Figure 9B:
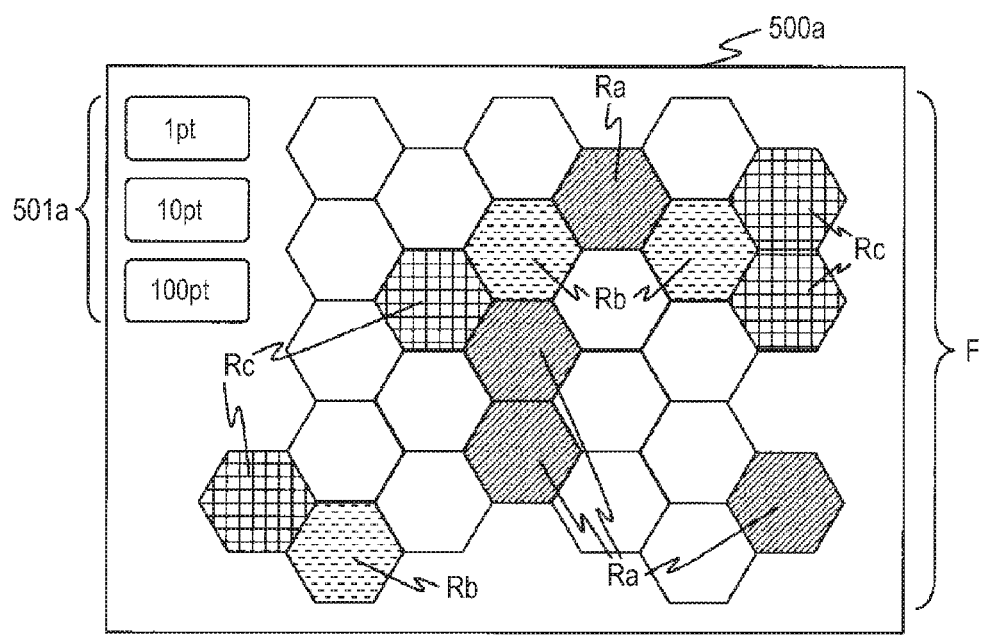

FIG. 9B may be a diagram illustrating an example of the game screen 500a which may be displayed again in the display unit 24 of the portable terminal 2a.

The game field F and a region-point designation button 501a which may be operation targets of player A may be displayed on the game screen 500a. The corresponding region Ra of player A, the corresponding region Rb of player B, and the corresponding region Rc of player C which have been set before the game screen 500a may be displayed again (when the previous operable period may be ended) may be displayed in the game field F. The corresponding region Rc of player C may be displayed based on predetermined color information associated with player C, so as to enable the region Rc to be distinguished from from other game regions R, the corresponding region Ra of player A, and the corresponding region Rb of player B. Player A may designate the region-point designation button 501a, so as to designate a desired game region R. Thus, player A correlates at least a portion of the owned points associated with player A, with the desired game region R, as the region points.

Player A may correlate the region points with the corresponding region Ra of player A, the corresponding region Rb of player B, and the corresponding region Rc of player C which have been displayed in the game screen 500a. In a case where player A sets one or more region points in the corresponding region Ra of player A before the game screen 500a may be displayed again, the region points which may be designated this time may be added to the region points of player A for the corresponding region Ra, which have been already correlated. Then, the region points of player A, which may be obtained by the addition may be correlated with the corresponding region Ra.

As described above, a set of the game screens 500a, 500b, and 500c, a set of the game screens 700a, 700b, and 700c, and a set of the game screens 800a, 800b, and 800c may be sequentially displayed in the display units 24 of the portable terminals 2a, 2b, and 2c for each predetermined operable period. Then, the set of the game screens 500a, 500b, and 500c, a set of the game screens 700a, 700b, and 700c, and a set of the game screens 800a, 800b, and 800c may be displayed again in the display units 24 of the portable terminals 2a, 2b, and 2c for each predetermined operable period. In an exemplary embodiment, if a series of processes in which all players who participate in the game perform an input operation in the input operation order for each predetermined operable period is performed the predetermined number of times, the game may be ended.

Figure 10:
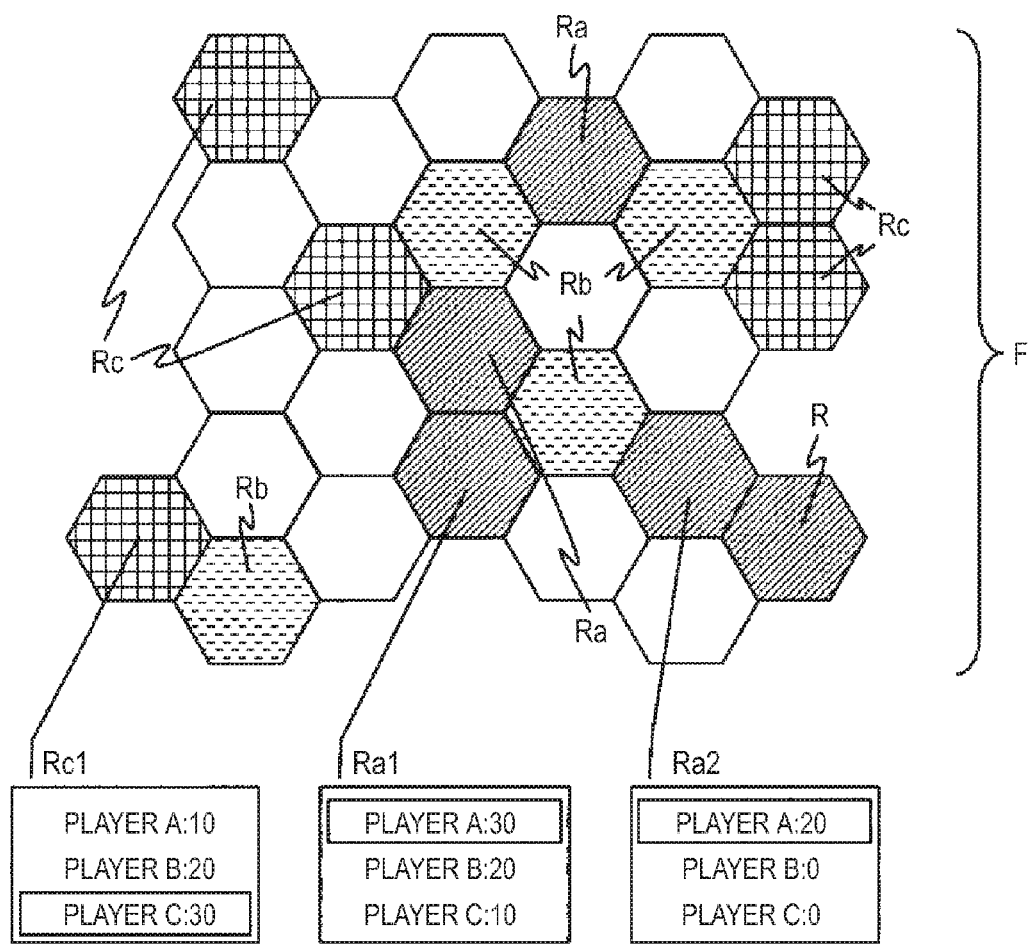
FIG. 10 is a schematic diagram illustrating an example of setting a corresponding region.
Figure 11:
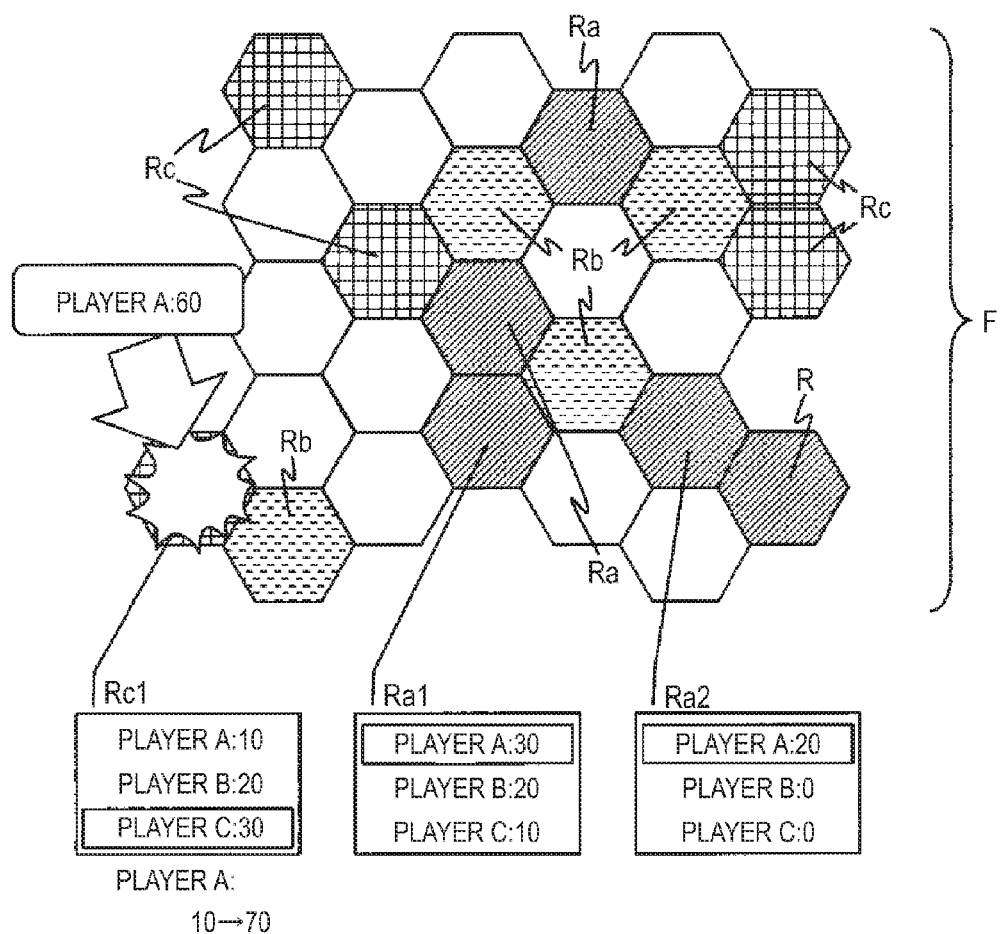
FIG. 11 is a schematic diagram illustrating the example of setting the corresponding region.
Figure 12:
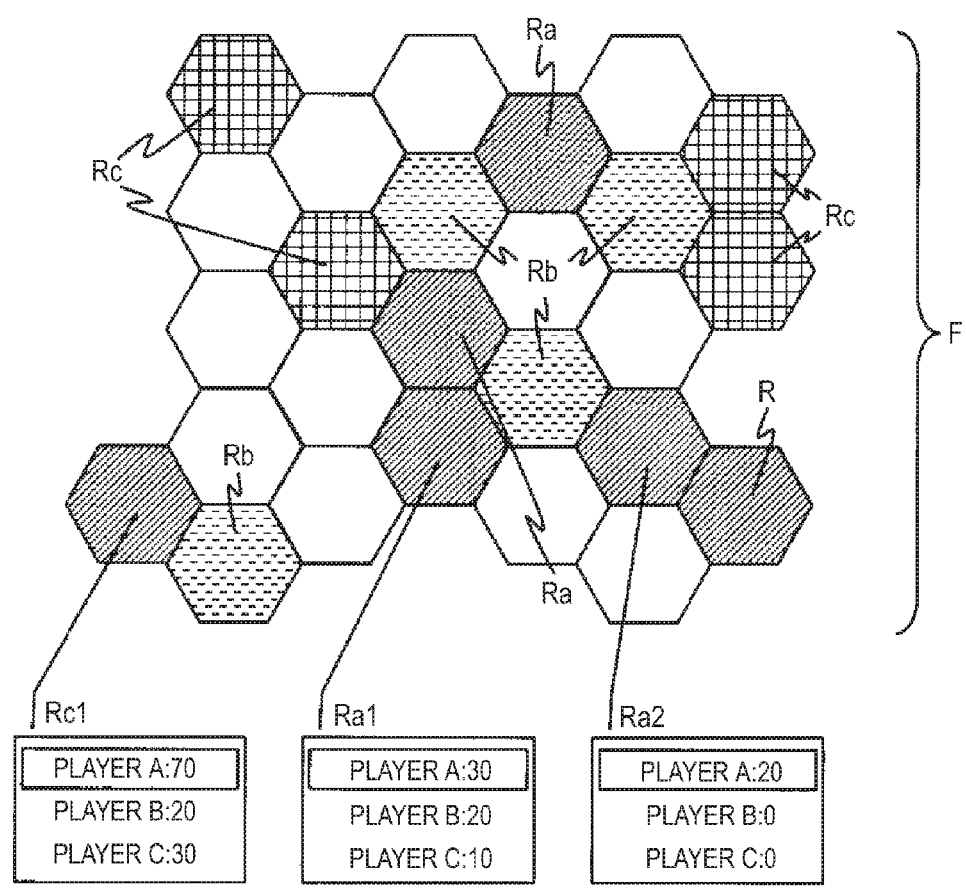
FIG. 12 is a schematic diagram illustrating the example of setting the corresponding region.

FIGS. 10 to 12 may be schematic diagrams illustrating an example of setting the corresponding region Ra of player A, the corresponding region Rb of player B, and the corresponding region Rc of player C.

In the example of the game field F illustrated in FIG. 10, 10 points, 20 points, and 30 points may be respectively correlated with the game region Rc1, as the region points of player A, player B, and player C. Thus, the game region Rc1 may be set as the corresponding region of player C.

30 points, 20 points, and 10 points may be respectively correlated with the game region Ra1, as the region points of player A, player B, and player C. Thus, the game region Ra1 maybe set as the corresponding region of player A. 20 points, 0 point, and 0 point may be respectively correlated with the game region Ra2, as the region points of player A, player B, and player C. Thus, the game region Ra2 may be set as the corresponding region of player A.

FIG. 11 illustrates a case where player A further correlates 60 points as the region point, with the corresponding region Rc1 of player C in the game field F illustrated in FIG. 10. In this case, a region point of 60 points, which may be correlated this time may be added to the region point of 10 points of player A, which has been already correlated with the corresponding region Rc1. Thus, the region point of 70 points of player A after addition may be correlated with the corresponding region Rc1.

FIG. 12 illustrates a display form in a case where a new region point of player A may be correlated with the corresponding region Rc1 of player C in the game field F illustrated in FIG. 11. The region point of player A, which may be correlated with the corresponding region Rc1 may be 70 points which may be larger than the region points of player B and player C. Thus, the corresponding region Rc1 may be set as a corresponding region Ra3 of player A. The corresponding region Ra3 may be displayed based on the predetermined color information associated with player A.

FIGS. 13 to 16 may be schematic diagrams illustrating an example of the region-point changing processing.

Figure 13:
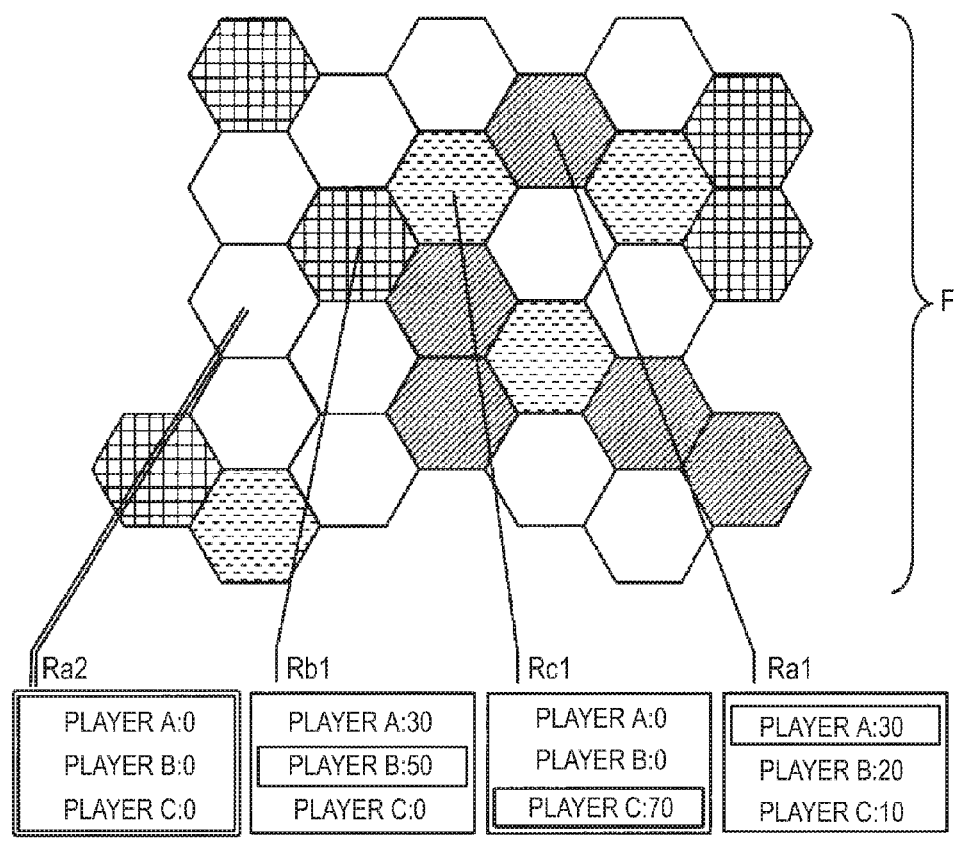
FIG. 13 is a schematic diagram illustrating an example of region-point changing processing.

In the example of the game field F illustrated in FIG. 13, 30 points, 20 points, and 10 points may be respectively correlated with the game region Ra1, as the region points of player A, player B, and player C. Thus, the game region Ra1 may be set as the corresponding region of player A.

30 points, 50 points, and 0 points may be respectively correlated with the game region Rb1, as the region points of player A, player B, and player C. Thus, the game region Rb1 may be set as the corresponding region of player B. 0 points, 0 points, and 70 points may be respectively correlated with the game region Rc1, as the region points of player A, player B, and player C. Thus, the game region Rc1 may be set as the corresponding region of player C.

0 points, 0 points, and 0 points may be respectively correlated with the game region Ra2, as the region points of player A, player B, and player C. Thus, the game region Ra2 may not be set as the corresponding region of the players.

Figure 14:
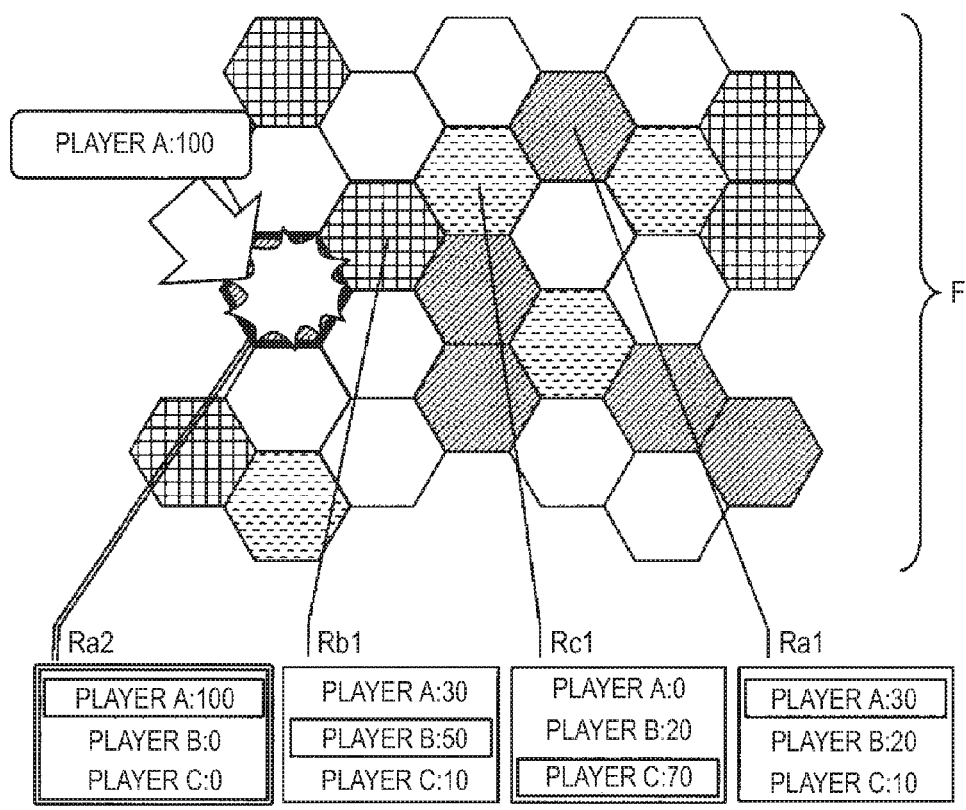
FIG. 14 is a schematic diagram illustrating the example of the region-point changing processing.

FIG. 14 illustrates a display form in a case where player A correlates 100 points as a new region point, with the game region Ra2 in the game field F illustrated in FIG. 13. In this case, the region point of player A may not be correlated with the game region Ra2. Thus, the region point of 100 points, which may be correlated this time may be correlated with the game region Ra2. Since the region point of player A, which may be correlated with the game region Ra2 may be 100 points which may be larger than the region points of player B and player C, the game region Ra2 may be set as the corresponding region of player A.

Figure 15:
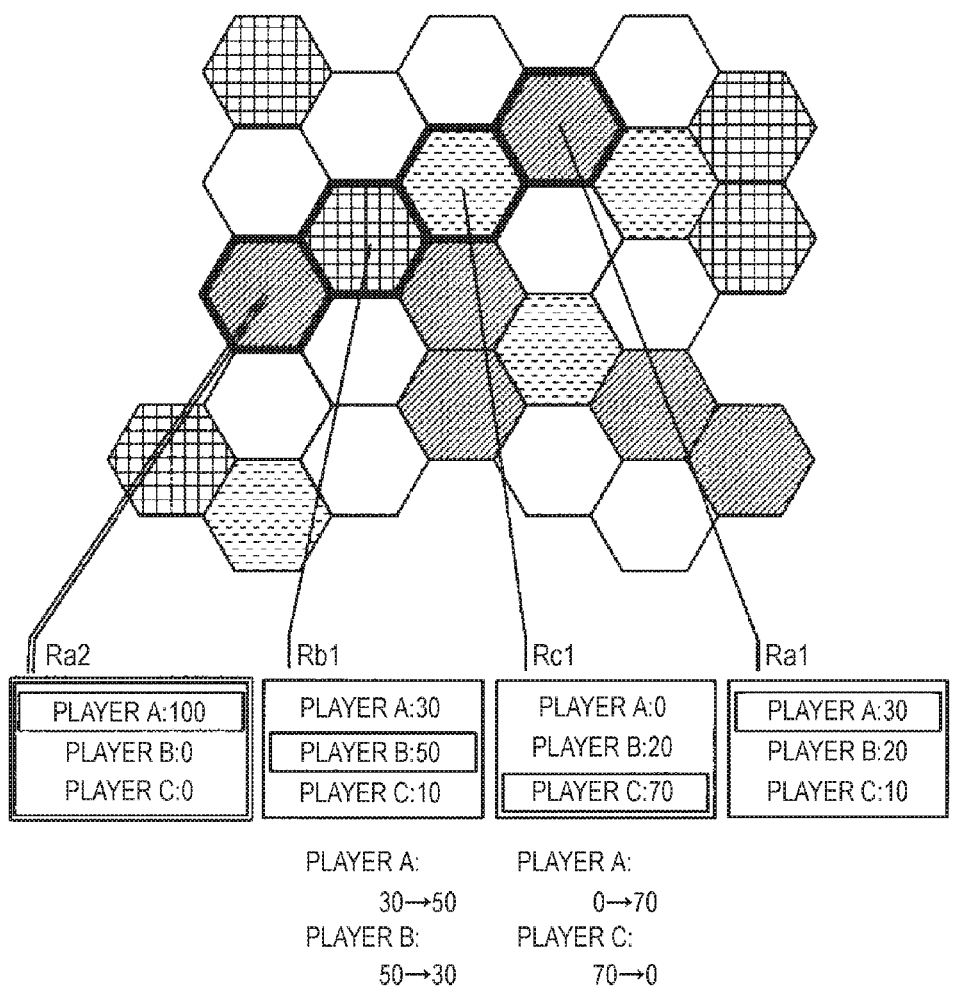
FIG. 15 is a schematic diagram illustrating the example of the region-point changing processing.

FIG. 15 illustrates a case where the game regions Rb1 and Rc1 may be arranged between the corresponding region Ra2 of player A, which may be set this time, and the other corresponding region Ra1 of player A, which has been previously set.

In the example illustrated in FIG. 15, the region points of player A, which may be correlated with the game region Rb1, and the region points of player B who has the game region Rb1 as the corresponding region may be extracted. The extracted region points of 50 points of player B may become region points of player A, with the game region Rb1. The extracted region point of 30 points of player A may become the region points of player B, in the game region Rb1.

In addition, the region points of player A, which may be correlated with the game region Rc1, and the region points of player C who has the game region Rc1 as the corresponding region may be extracted. The extracted region points of 70 points of player C may become the region points of player A, with the game region Rc1. The extracted region point of 0 point of player A may become the region points of player C, in the game region Rc1.

Figure 16:
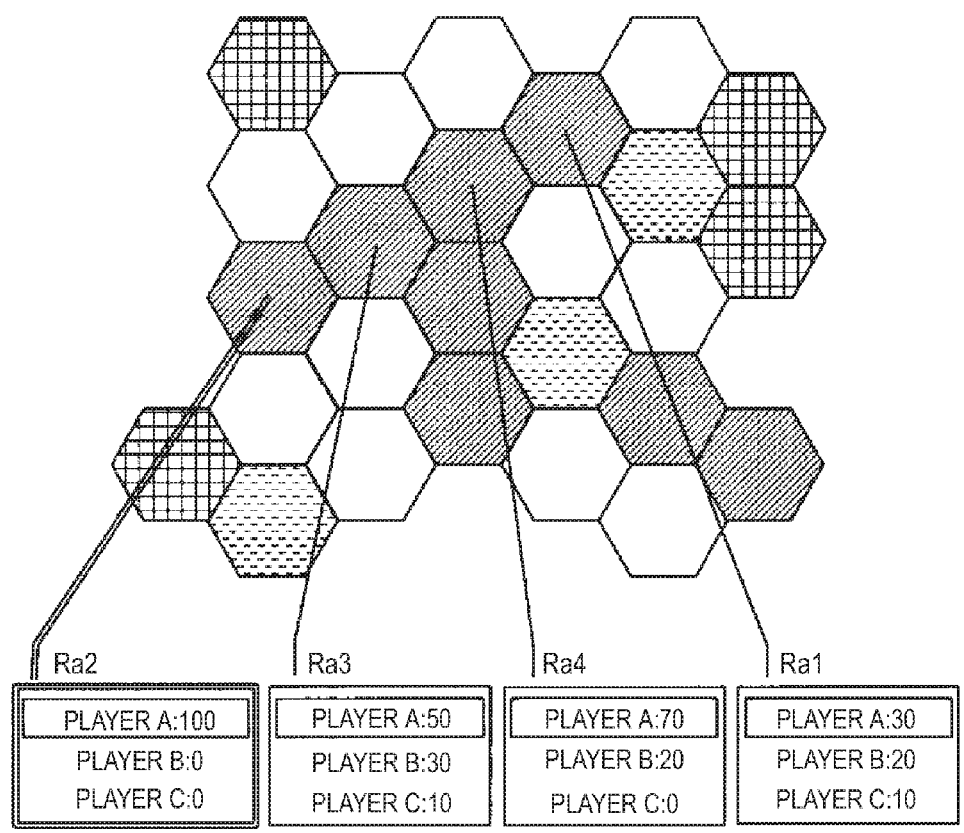
FIG. 16 is a schematic diagram illustrating the example of the region-point changing processing.

FIG. 16 illustrates a display form after the region-point changing processing may be performed on the corresponding regions Rb1 and Rc1 in the game field F illustrated in FIG. 15. The region points of 50 points of player A, which may be correlated with the game region Rb1 may be larger than the region points of 30 points of player B, and the region points of 10 points of player C, which may be correlated with the game region Rb1. Thus, the game region Rb1 may be set as a corresponding region Ra1 of player A. The region points of 70 points of player A, which may be correlated with the game region Rc1 may be larger than the region points of 20 points of player B, and the region points of 0 point of player C, which may be correlated with the game region Rc1. Thus, the game region Rc1 may be set as a corresponding region Ra4 of player A.

Hitherto, the descriptions may be made with reference to FIGS. 13 to 16. In the game in which a game region may be correlated with a player, it may be possible to obtain a game region as a corresponding region of a player without the player designating a corresponding region of another player, by the region-point changing processing. That is, a player can acquire the region points of another player, which corresponds to the corresponding region of this player, without directly consuming the owned point for the corresponding region of this player. Thus, it may be possible to provide a game requiring players to exercise a strategy.

Configuration of Server 3

Figure 17:
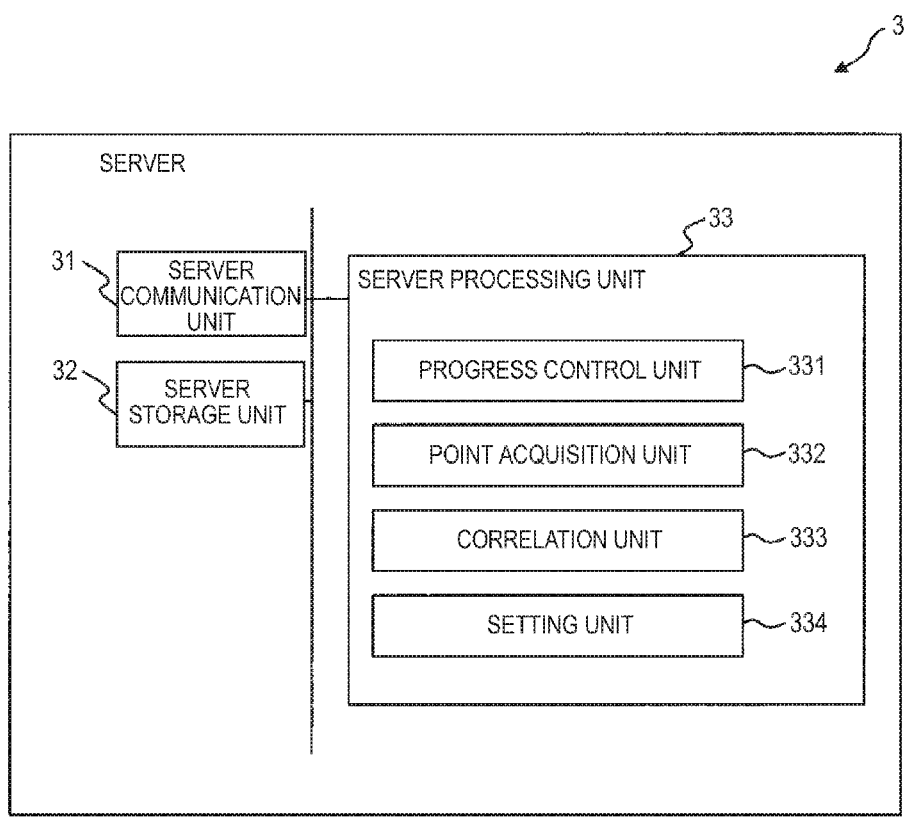
FIG. 17 is a diagram illustrating an example of a schematic configuration of a server.

FIG. 17 may be a diagram illustrating an example of a schematic configuration of the server 3. FIGS. 18A to 19B may be diagrams illustrating an example of data structures of various tables stored in a server storage unit 32.

The server 3 may include a server communication unit 31, the server storage unit 32, and a server processing unit 33. The server 3 may cause various games such as a domination game to proceed, in accordance with a request from the portable terminal 2. The server 3 may create display data and the like regarding the progress of the game, and may transmit the created display data to the portable terminal 2.

The server communication unit 31 may include a communication interface circuit for connecting the server 3 to the Internet 7, and may thus perform communication with the Internet 7. The server communication unit 31 may supply data which has been received from the portable terminal 2 and the like, to the server processing unit 33. The server communication unit 31 may transmit data supplied from the server processing unit 33, to the portable terminal 2 and the like.

The server storage unit 32 may include at least one of a magnetic tape device, a magnetic disk device, and an optical disk device, for example. The server storage unit 32 may store an operating system program, a driver program, an application program, data, and the like which may be used in processing in the server processing unit 33. For example, the server storage unit 32 may store a game program and the like of causing the game to proceed and creating display data regarding a result, as the application program. For example, the computer program maybe installed on the storage unit 22 from a computer-readable portable type recording medium such as a CD-ROM and a DVD-ROM, by using a well-known set-up program and the like.

The server storage unit 32 may store a player table illustrated in FIG. 18A, a game field table illustrated in FIG. 18B, and the like, as the data. The server storage unit 32 may store a game table illustrated in FIG. 19A, and may store a region point table illustrated in FIG. 19B. The server storage unit 32 may store various types of image data and the like regarding the progress of the game. Further, the server storage unit 32 may temporarily store temporary data regarding predetermined processing. That is, the server storage unit 32 may include a volatile memory (random access memory, RAM), and may store dynamic data which changes depending on the progress of the game.

FIG. 18A illustrates the player table for managing a player. A player ID, the name, the owned point, and the like of a player may be stored in the player table for each player, in a state of being associated with each other. The player ID may be an example of identification information for recognizing players at once.

FIG. 18B illustrates the game field table for managing the game field F. A field ID, game region information, and the like of the game field may be stored in the game field table for each game field, in a state of being associated with each other. The field ID may be an example of identification information for recognizing game fields at once.

A region ID, a position, and the like of each of a plurality of game regions R included in each game field may be stored in the game region information, in a state of being associated with each other. The region ID may be an example of identification information for recognizing game regions R which may be included in each game field at once. The position may be a position at which each of the game regions R may be disposed in each game field. For example, the position may be two-dimensional coordinates of the center point of each of the game regions R.

FIG. 19A illustrates the game table for managing a game. A game ID, a field ID, participation player information, and the like of a game may be stored in the game table for each executed game, in a state of being associated with each other. The game ID may be an example of identification information for recognizing games at once. The field ID may be a field ID of a game field used in a game, and may be a field ID stored in the game field table.

Player IDs of participation players who participate in a game may be stored in the participation player information, in a state of being arranged in an input operation order. In a game, the first player in the input operation order may be referred to as the first player below. The second player, the third player, and the like in the input operation order may be referred to as the second player, the third player, and the like below.

FIG. 19B illustrates the region point table for managing a region point correlated with a game region R. The region point table may be created for each executed game. The region point table may be stored in association with the game ID of the game. A region ID, region point information, and the like of a game region R may be stored in the region point table for each game region R of a game field F used in the game, in a state of being associated with each other.

Region points of each game region, which may be respectively correlated by a plurality of players who participate in the game may be stored in the region point information, in a state of being associated with each other. That is, region points of each game region, which may be respectively correlated by the first player, the second player, and the like may be stored in association with each other.

Returning to FIG. 17, the server processing unit 33 may include at least a progress control unit 331, a point retrieval unit 332, a correlation unit 333, and a setting unit 334. The units may be functional modules realized by a program which maybe executed by a processor included in the server processing unit 33. In addition, the units may be mounted as a firmware in the server 3.

An example of the display processing unit 251 and the input processing unit 252 included in the processing unit 25 of the portable terminal 2, and an example of the progress control unit 331, the point retrieval unit 332, the correlation unit 333, and the setting unit 334 included in the server processing unit 33 of the server 3 will be described below.

Function of Display Processing Unit 251

The display processing unit 251 in the portable terminal 2 may display a game screen in the display unit 24, based on display data which has been received from the server 3 through the communication unit 21. In a case where the received display data may be display data for displaying a game screen which may be used for causing a player to designate a game region R included in a game field F, the display processing unit 251 may display a region-point designation button along with the game field F. In a case where the received display data may be display data for displaying a game screen which may be used for browsing the game field F, the display processing unit 251 may display the game field F.

In a case where the owned point of a player who will perform an input operation in the next operable period may be received from the server 3 through the communication unit 21, the display processing unit 251 may store the received owned point of the player in the storage unit 22.

Function of Input Processing Unit 252

In a case where an instruction to transmit a request of participating in a game provided by the server 3 may be performed by a player operating the input unit 23, the input processing unit 252 in the portable terminal 2 may transmit a participation request for participating in the game, to the server 3 through the communication unit 21. The participation request may include the player ID of a player who transmits the participation request, the game ID of a game to be participated, and the like.

If the game screen for causing a player to designate a game region R included in the game field F may be displayed by the display processing unit 251, the input processing unit 252 accepts game region designation in an operable period. In accepting processing of the game region designation, firstly, the input processing unit 252 may store region points correlated with a game region R, based on a region-point designation button and the game region R which have been designated by a player operating the input unit 23. The region points may be stored in the storage unit 22, in association with the region ID of the game region R. The input processing unit 252 subtracts the correlated region points from the owned point of the player, which may be stored in the storage unit 22. The input processing unit 252 may store the subtracted owned point in the storage unit 22. Whenever the owned point maybe subtracted, the display processing unit 251 may display the subtracted owned point on the game screen.

The input processing unit 252 instructs the display processing unit 251 to end display of the game screen when the operable period may be ended. The input processing unit 252 transmits input data to the server 3 through the communication unit 21. The transmitted input data may include the player ID of a player who holds the portable terminal 2, and a region point associated with the region ID stored in the storage unit 22.

Function of Progress Control Unit 331

If a participation request is received from the portable terminal 2 through the server communication unit 31, the progress control unit 331 in the server 3 may perform game start processing. In the game start processing, firstly, the progress control unit 331 may specify a player ID and a game ID included in the participation request received from the portable terminal 2. Then, the progress control unit 331 may store the specified player ID in the participation player information of the game table. The specified player ID may be stored as the player ID of a participation player who participates in a game indicated by the specified game ID, in association with the specified game ID. The specified player ID may be stored as the player ID of a participation player, in the participation player information, in an order of receiving the participation request. Then, in a case where there is a game in which the number of persons participating reaches an upper limit which enables participation in the game, with reference to the participation player information of the game table, the progress control unit 331 may start the game. The input operation order for each player, which may be stored in the participation player information may not be limited to the order of receiving the participation request. For example, in a case where the number of persons participating reaches an upper limit which enables participation in the game, with reference to the participation player information of the game table, the progress control unit 331 may randomly line up player IDs included in the participation player information, and may store the list of the player IDs in the participation player information.

If the game is started, the progress control unit 331 may transmit display data for displaying a game screen of the started game, to portable terminals 2 of players ID included in the participation player information associated with the started game, with reference to the game table. A game field F including a game region R based on game region information which may be extracted from the game field table and relates to a field ID associated with the game ID of the started game may be included in the game screen of the started game. The region-point designation button may be included along with the game field F, in the game screen transmitted to the portable terminal 2 of the first player ID included in the participation player information.

If the region points for each region ID after the region-point changing processing are stored by the setting unit 334, the progress control unit 331 may create display data for displaying a game screen. The created display data may be display data for displaying a game screen including the game field F which may include a corresponding region colored based on the region point after the region-point changing processing. The progress control unit 331 may specify the player ID corresponding to the next input operation order among player IDs included in input data, with reference to the game table. The progress control unit 331 may create display data which maybe transmitted to the portable terminal 2 for the specified player ID. In the created display data, the region-point designation button may be included in the game screen.

The progress control unit 331 may transmit display data to the portable terminal 2 for the player ID corresponding to the next input operation order, and may simultaneously extract the owned point associated with the player ID, from the player table. The progress control unit 331 may transmit the extracted owned point to the portable terminal 2 for the player ID.

Function of Point Retrieval Unit 332

The point retrieval unit 332 in the server 3 may retrieve input data which has been received from the portable terminal through the server communication unit 31. The point retrieval unit 332 may retrieve the player ID of a player, and a region point associated with the region ID. The player ID and the region point may be included in the retrieved input data.

The point retrieval unit 332 may retrieve region point information associated with the region ID stored in the region point table.

The point retrieval unit 332 may calculate the summation value of region points which may be respectively associated with region IDs included in the input data received when an operable period may be ended. The point retrieval unit 332 may subtract the calculated summation value from the owned point of the player, which has been stored in the player table. The point retrieval unit 332 may store the subtracted owned point of the player, in the player table.

Function of Correlation Unit 333

The correlation unit 333 in the server 3 may add a region point associated with each region ID, to the region point corresponding to the player ID included in input data. The region ID may be included in the input data retrieved by the point retrieval unit 332. The region point may be stored in the region point information associated with each region ID stored in the region point table. The correlation unit 333 may output a region point after addition. The correlation unit 333 may specify the region ID of a game region R in which the region point value corresponding to the player ID included in the input data may be larger than all region points of other players in the region point after addition, and, in the region point information, the region point value corresponding to the player ID included in the input data may be smaller than region points of all other players, as the current corresponding region ID.

Function of Setting Unit 334

If the current corresponding region ID is specified by the correlation unit 333, the setting unit 334 in the server 3 performs specifying processing of a point-change target region. According to an exemplary embodiment, when specifying processing of a point-change target region, firstly, the setting unit 334 may extract region point information stored in the region point table. Then, the setting unit 334 may specify a region ID of a game region in which a region point corresponding to the player ID stored in the input data may be larger than region points of all other players, as the previous corresponding region ID in the region point information. Then, the setting unit 334 may specify region IDs of game regions disposed in predetermined arrangement, between the current corresponding region ID and the previous corresponding region ID with reference to the game field table. In a case where all of the specified game regions disposed in the predetermined arrangement may be corresponding regions of other players which may be different from the player of the player ID included in the input data, the setting unit 334 may specify the specified game regions disposed in the predetermined arrangement, as point-change target regions. With the above descriptions, the specifying processing of a point-change target region may be ended.

In a case where the point-change target region is specified by the specifying processing of a point-change target region, the setting unit 334 may perform point change processing. In the point change processing, firstly, the setting unit 334 may extract region point information associated with a region ID of a region-point changing target region, from the region point table. Then, the setting unit 334 may extract the largest region point and a region point corresponding to the player ID included in the input data, in the extracted region point information, for the region ID of the region-point changing target region. Then, the setting unit 334 may generate region point information obtained by replacing the extracted largest region point with the region point corresponding to the player ID included in the input data, for the region ID of the region-point changing target region. The setting unit 334 may store the generated region point information in the region point table.

Operation Sequence of Game System 1

Figure 20:
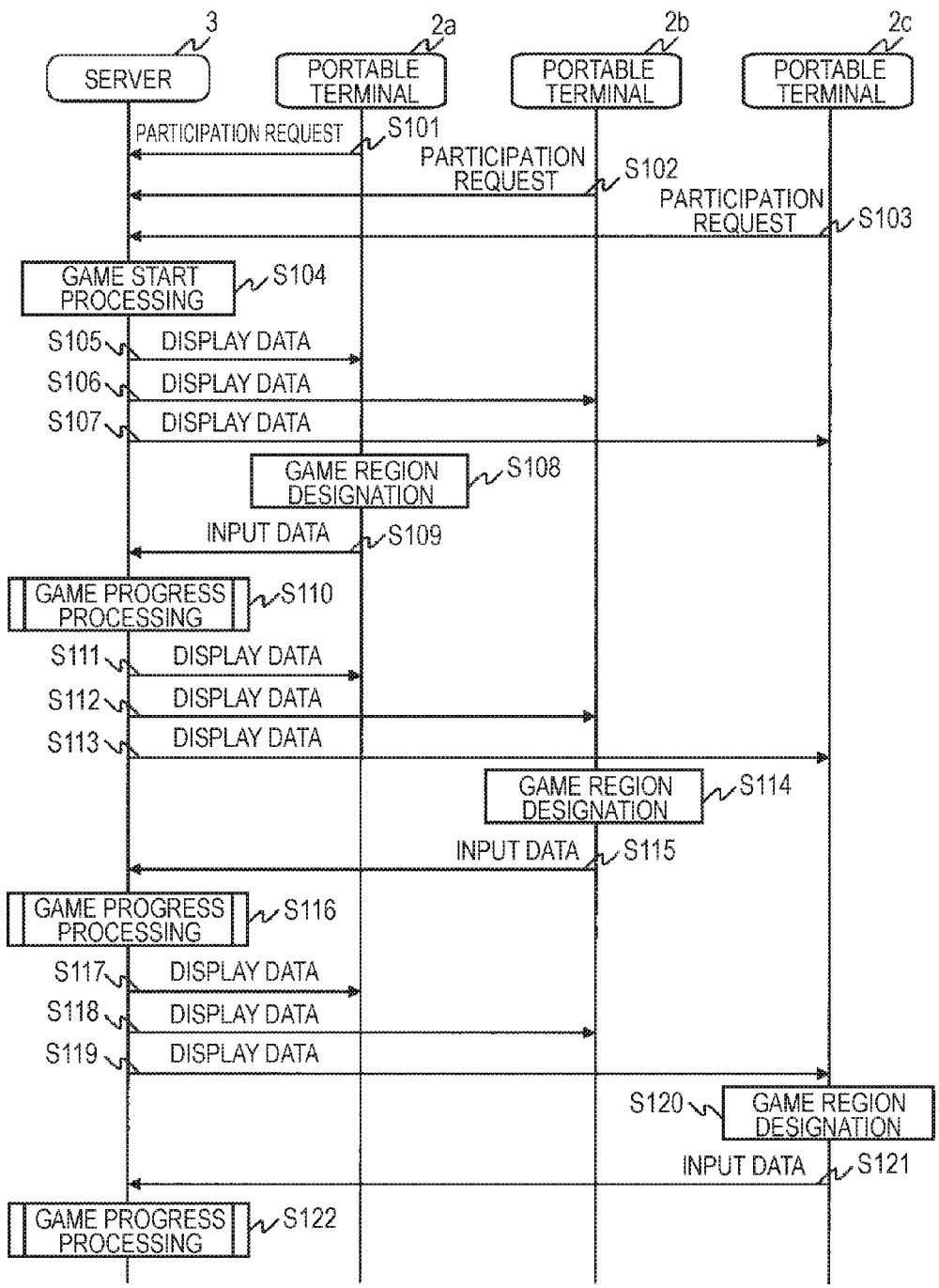
FIG. 20 is a diagram illustrating an example of an operation sequence of the game system.

FIG. 20 may be a diagram illustrating an example of an operation sequence of the game system 1. The operation sequence may be executed based on a program which has been stored in advance in the storage unit 22 and the server storage unit 32. The operation sequence may be mainly executed by the processing unit 25 and the server processing unit 33, in cooperation with the components of the portable terminal 2 and the server 3. As an example, an operation sequence of the game system 1 in which the server 3 provides a game in which player A, player B, and player C participate, for the portable terminal 2a of player A, the portable terminal 2b of player B, and the portable terminal 2c of player C will be described below.

Firstly, the input processing unit 252 in the portable terminal 2a of player A may transmit a participation request for participating in a game, to the server 3 through the communication unit 21 in accordance with an operation of the input unit 23 by player A (Step S101).

The input processing unit 252 in the portable terminal 2b of player B may transmit a participation request for participating in a game, to the server 3 through the communication unit 21 in accordance with an operation of the input unit 23 by player B (Step S102).

The input processing unit 252 in the portable terminal 2c of player C may transmit a participation request for participating in a game, to the server 3 through the communication unit 21 in accordance with an operation of the input unit 23 by player C (Step S103).

In Steps S101 to S103 in the operation sequence illustrated in FIG. 20, the participation requests may be transmitted to the server 3 in an order of the portable terminal 2a, the portable terminal 2b, and the portable terminal 2c. However, the order of transmission may not be limited thereto. That is, processes of Steps S101 to S103 may be executed in an order of the participation request being transmitted by the portable terminal 2.

Then, if the participation request is received from each of the portable terminal 2 through the server communication unit 31, the progress control unit 331 in the server 3 may perform the game start processing (Step S104). Descriptions will be made below on the assumption that player A, player B, and player C respectively correspond to the first player, the second player, and the third player.

Then, the progress control unit 331 may transmit display data for displaying the game screen 500a which may be used for causing player A to designate a game region R included in the game field F, to the portable terminal 2a of player A through the server communication unit 31 (Step S105). The progress control unit 331 may transmit the owned point of player A to the portable terminal 2a of player A through the server communication unit 31.

The progress control unit 331 may transmit display data for displaying the game screen 500b which may be used for browsing the game field F, to the portable terminal 2b of player B through the server communication unit 31 (Step S106).

The progress control unit 331 may transmit display data for displaying the game screen 500c which may be used for browsing the game field F, to the portable terminal 2c of player C through the server communication unit 31 (Step S107).

Then, the display processing unit 251 of the portable terminal 2a may display the game screen 500a based on the display data which has been received from the server 3 through the communication unit 21. The input processing unit 252 of the portable terminal 2a may accept game region designation in an operable period (Step S108). The display processing unit 251 may store the received owned point of player A, in the storage unit 22 before execution of Step S108.

Then, the input processing unit 252 of the portable terminal 2a may transmit input data which may include a region point correlated with the game region R, to the server 3 through the communication unit 21 (Step S109).

Then, if the input data may be received from the portable terminal 2a of player A, the progress control unit 331, the point retrieval unit 332, the correlation unit 333, and the setting unit 334 in the server 3 execute the game progress processing (Step S110). Details of the game progress processing will be described later.

Then, the progress control unit 331 may transmit display data for displaying the game screen 700a which may be used for browsing the game field F, to the portable terminal 2a of player A through the server communication unit 31 (Step S111).

The progress control unit 331 transmits display data for displaying the game screen 700b which may be used for causing player B to designate a game region R included in the game field F, to the portable terminal 2b of player B through the server communication unit 31 (Step S112). The progress control unit 331 may transmit the owned point of player B to the portable terminal 2b of player B through the server communication unit 31.

The progress control unit 331 may transmit display data for displaying the game screen 700c which may be used for browsing the game field F, to the portable terminal 2c of player C through the server communication unit 31 (Step S113).

Then, the display processing unit 251 of the portable terminal 2b may display the game screen 700b based on the display data which has been received from the server 3 through the communication unit 21. The input processing unit 252 of the portable terminal 2b may accept game region designation in an operable period (Step S114). The display processing unit 251 may store the received owned point of player B, in the storage unit 22 before execution of Step S114.

Then, the input processing unit 252 of the portable terminal 2b may transmit input data which may include a region point correlated with the game region R, to the server 3 through the communication unit 21 (Step S115).

Then, if the input data is received from the portable terminal 2b of player B, the progress control unit 331, the point retrieval unit 332, the correlation unit 333, and the setting unit 334 in the server 3 may perform the game progress processing (Step S116). Details of the game progress processing will be described later.

Then, the progress control unit 331 may transmit display data for displaying the game screen 800a which may be used for browsing the game field F, to the portable terminal 2a of player A through the server communication unit 31 (Step S117).

The progress control unit 331 may transmit display data for displaying the game screen 800b which may be used for browsing the game field F, to the portable terminal 2b of player B through the server communication unit 31 (Step S118).

The progress control unit 331 may transmit display data for displaying the game screen 800c which may be used for causing player C to designate a game region R included in the game field F, to the portable terminal 2c of player C through the server communication unit 31 (Step S119). The progress control unit 331 may transmit the owned point of player C to the portable terminal 2c of player C through the server communication unit 31.

Then, the display processing unit 251 of the portable terminal 2c may display the game screen 800c based on the display data which has been received from the server 3 through the communication unit 21. The input processing unit 252 of the portable terminal 2c may accept a game region designation in an operable period (Step S120). The display processing unit 251 may store the received owned points of player C, in the storage unit 22, before execution of Step S120.

Then, the input processing unit 252 of the portable terminal 2c may transmit input data which may include a region point correlated with the game region R, to the server 3, through the communication unit 21 (Step S121).

Then, if the input data is received from the portable terminal 2c of player C, the progress control unit 331, the point retrieval unit 332, the correlation unit 333, and the setting unit 334 in the server 3 may perform the game progress processing (Step S122). Details of the game progress processing will be described later.

After that, the above-described processes of Step S105 to Step S122 may be executed until each of the portable terminals 2 performs the game region designation the number of times, which may be preset by the server 3.

Game Progress Processing

Figure 21:
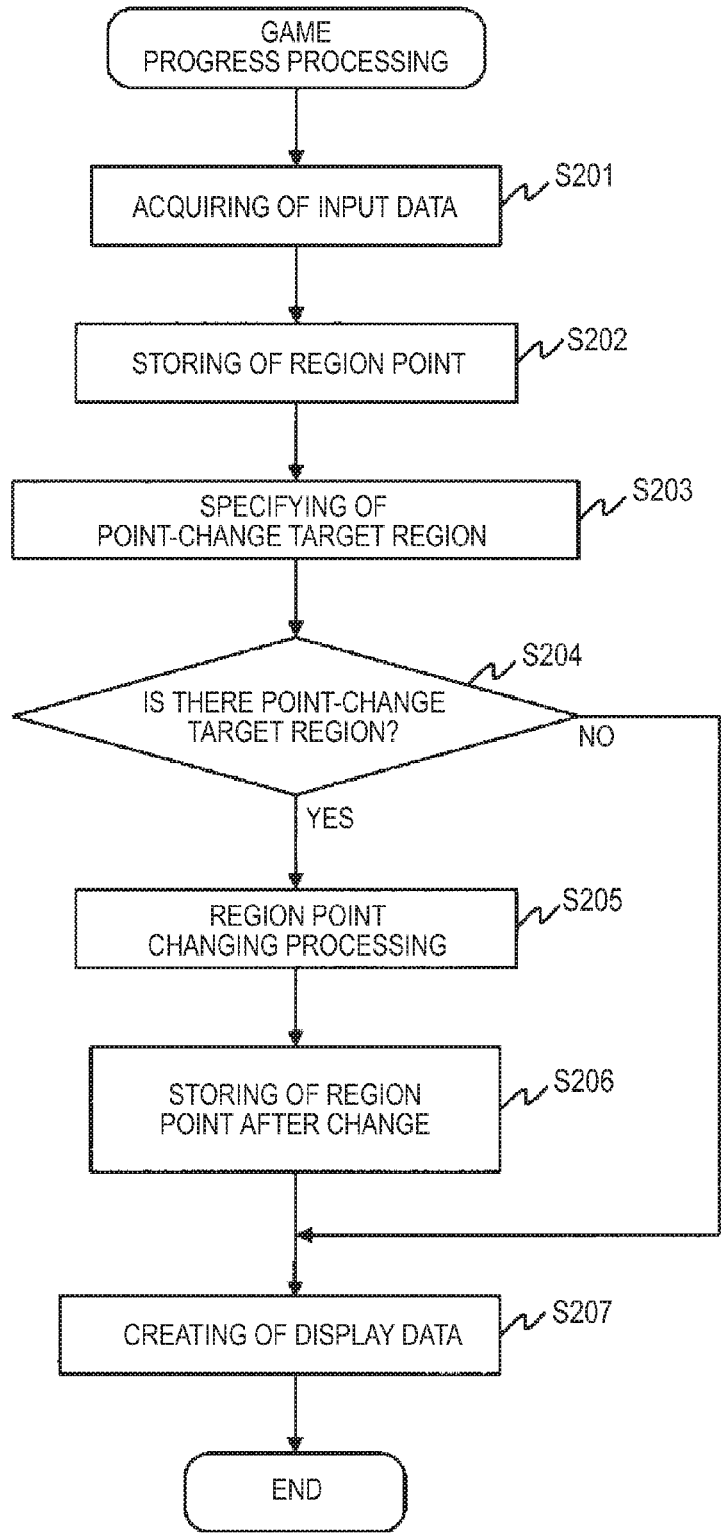
FIG. 21 is a diagram illustrating an example of an operation flow of game progress processing.

FIG. 21 may be a diagram illustrating an example of an operation flow of the game progress processing performed by the progress control unit 331, the point retrieval unit 332, the correlation unit 333, and the setting unit 334. The game progress processing illustrated in FIG. 21 may be executed in the processes of Steps S110, S116, and S122 in FIG. 20.

Firstly, the point retrieval unit 332 may retrieve the player ID of a player and a region point associated with a region ID, from the input data which has been received from the portable terminal 2 through the server communication unit 31 (Step S201). The point retrieval unit 332 may retrieve region point information associated with the region ID stored in the region point table. In Step S201, the point retrieval unit 332 may store the subtracted owned point of the player, in the player table, based on the summation value of region points associated with the region ID included in the input data.

Then, the correlation unit 333 may calculate a region point after addition, and may specify the current corresponding region ID (Step S202).

Then, if the current corresponding region ID may be specified, the setting unit 334 may perform the specifying processing of a point-change target region (Step S203).

Then, the setting unit 334 may determine whether or not the point-change target region may be specified by the specifying processing of a point-change target region (Step S204).

In a case where no point-change target region is specified (No in Step S204), the setting unit 334 may cause the process to proceed to Step S207.

In a case where the point-change target region is specified (Yes in Step S204), the setting unit 334 may perform the region-point changing processing (Step S205).

Then, the setting unit 334 may store the region point after the region-point changing processing, as region point information of the region point table for each region ID (Step S206). In a case where the last game progress processing in the executed game is performed, the process of Step S206 may be executed, and a series of steps may be ended.

The progress control unit 331 may create display data for displaying a game screen which may include the game field F including the corresponding region colored based on the region point information of the region point table (Step S207), and may then end a series of steps.

Hitherto, as described above in detail, the game system performs the region-point changing processing in a domination game. Thus, a first player can have the region points of another player, which may be correlated with a game region R, as the region points of the first player without designating the game region R. Thus, it may be possible to realize a game requiring a player to exercise a strategy, improving the player's interest for the game. In the above descriptions, as an example, the descriptions may be made by using player A, player B, and player C as players participating in the game. However, the number of players participating in the game may not be limited to three. The shape of the game region may be any shape.

MODIFICATION EXAMPLE 1

In receiving processing of game region designation by the input processing unit 252 of the portable terminal 2, predetermined designation conditions may be associated with a plurality of game regions R included in the game field F which may be used in the game.

Figure 22A:
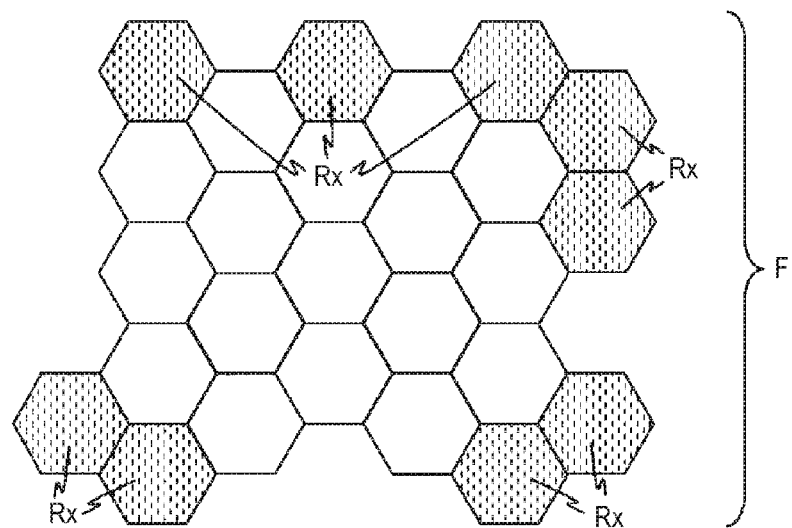
FIGS. 22A and 22B are schematic diagrams illustrating an example of a game field.

FIG. 22A may be a schematic diagram illustrating another example of the game field F used in the game.

In the example of the game field F illustrated in FIG. 22A, a game region Rx which does not function as the point-change target region may be disposed in the game field F. The game system 1 may associate a condition in that, in a case where a player correlates a region point with the game region Rx, a first predetermined point value may be consumed from the owned points of the player, with the game region Rx, as the predetermined designation condition. For example, in the game region information of the game field table, the first predetermined point value may be associated and stored in correlation with the region ID of a game region Rx. In a case where a game region R designated by a player operating an input unit 23 may be the game region Rx, the input processing unit 252 may consume the correlated region point(s) and the first predetermined point value associated with the region ID of the game region Rx, from the owned point of the player, which may be stored in the storage unit 22.

In this manner, in a case where a game region Rx of which a probability of being included in the predetermined arrangement may be lower than that of another game region R may be a region at an end portion of all game regions R included in the game field F, if a region point may be correlated with the game region Rx by a player, the correlated region point and the first predetermined point value associated with the game region Rx may be consumed from the owned point of the player.

The game region Rx of which a probability of being included in the predetermined arrangement may be lower than that of another game region R may not be limited to the game region Rx illustrated in FIG. 22A. For example, a game region R may be set as the game region Rx, in accordance with the number of other game regions R which may be adjacent to the game region R. In this case, for each game region R, the number of other game regions R which may be adjacent to each game region R may be calculated, and the first predetermined point value may be given a value depending on the calculated value that may be associated with each game region R. That is, in a case where one other game region R may be adjacent to a game region Rx, the first predetermined point value may be 100 points, for the game region Rx. In a case where two other game regions R may be adjacent to a game region Rx, the first predetermined point value may be 50 points, for the game region Rx. The first predetermined point value associated with a game region Rx may be calculated by a predetermined calculation expression (for example, 100/(the number of other game regions R which may be adjacent to the game region Rx)).

Thus, it may be possible to provide a game in which stimulation may be performed such that a case where game region R having a high probability of being included in the predetermined arrangement may be designated by a player occurs relatively frequently, and in which forming a point-change target region or predetermined arrangement may be promoted, and an occurrence of stalemate may be difficult. It may be possible to prevent an occurrence of a situation in which a player having the owned point of a value larger than that of other players correlates a large amount of region points with a game region Rx, in advance, and to prevent reduction of the will of other players to continue the game. The game region Rx may be an example of a first specific region.

In the example of the game field F illustrated in FIG. 22A, a condition relating to the upper limit of the region point correlated with the game region Rx by a player may be associated with the game region Rx, as the predetermined designation condition. For example, in the game region information of the game field table, a second predetermined point value may be associated and stored in correlation with the region ID of the game region Rx. In a case where the game region R designated by a player operating an input unit 23 may be the game region Rx, the input processing unit 252 may control correlation of the region point, so as to cause the summation value of region points of players, which may be correlated with the game region Rx, not to exceed the second predetermined point value. For example, in a case where designation of the game region Rx may be received, if it may be determined that the summation value of region points of players, which may be correlated with the game region Rx exceeds the second predetermined point value, the input processing unit 252 may cancel the received designation input.

Thus, it may be possible to prevent an occurrence of a situation in which a player correlates a large amount of region points with a game region Rx, in advance, which may help to prevent other players from losing the will to continue the game.

MODIFICATION EXAMPLE 2

The progress control unit 331 in the server 3 may change the game field F displayed by display data transmitted to the portable terminals 2, in accordance with the progress of the game.

Figure 22B:
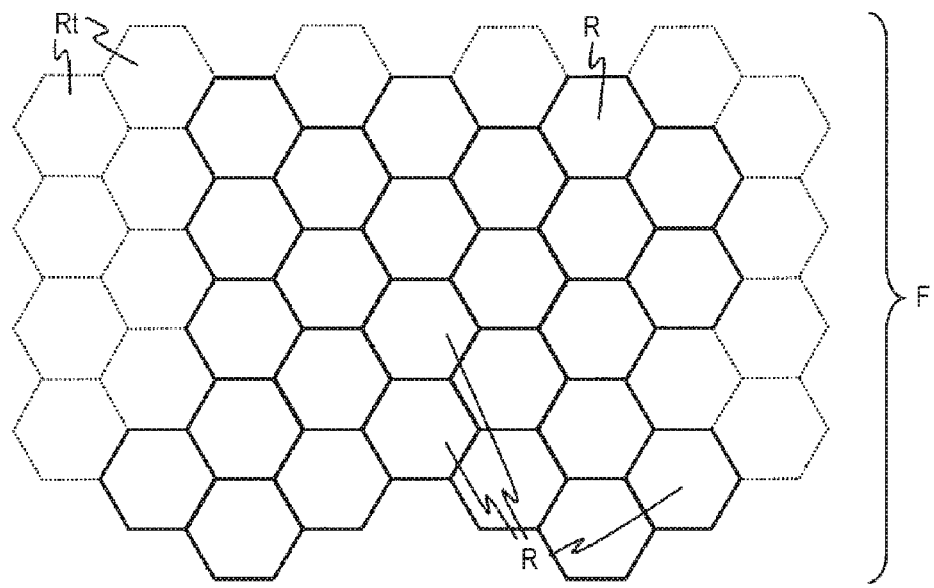

FIG. 22B may be a schematic diagram illustrating an example of the game field F used in the game.

In the example of the game field F illustrated in FIG. 22B, a restricted region Rt may be disposed in the game field F. It may not be possible for a player to designate the restricted region Rt at a time of starting the game. In a case where the restricted region Rt may be included in the game field F, the display processing unit 251 in the portable terminal 2 generally does not display the restricted region Rt, and but displays only game regions R included in the game field F.

Then, the progress control unit 331 in the server 3 may determine whether or not a predetermined game-field change condition may be satisfied, in accordance with game region designation of a player who participates in the game. Then, in a case where the predetermined game-field change condition is satisfied, the progress control unit 331 may change some of the restricted regions Rt to game regions R, and may create display data for displaying a game screen including a game field F which may include the changed game region R. The progress control unit 331 may transmit the created display data to the portable terminal 2.

For example, the predetermined game-field change condition may correspond to a case where the number of times of performing a series of processes in which all players participating in the game performs an input operation in an input operation order exceeds the predetermined number, or to a case where a region point may be correlated with a specific game region (game region and the like which may be adjacent to the restricted region Rt) by a player. The predetermined game-field change condition may correspond to a case where the number of game regions R correlated with a region point by all players participating in the game or by a specific player exceeds the predetermined number of regions, a case where the summation value of region points correlated with all or some of game region R among the game regions R correlated with region points exceeds a third predetermined point value, or a case where a predetermined period elapses from when the game may be started.

The game field F may not be limited to the example illustrated in FIG. 22B. For example, the game field F may include a first sub-game field F1, a second sub-game field F2, and a restricted region Rt. The first sub-game field F1 may include a plurality of first game regions R1. The second sub-game field F2 may include a plurality of second game regions R2. The restricted region Rt may be disposed between the first sub-game field F1 and the second sub-game field F2. In this case, if the restricted region Rt may be changed to a game region R, the restricted region Rt may be disposed on a game field F so as to cause the first sub-game field F1 and the second sub-game field F2 to form one game field F.

In a case where the above-described predetermined game-field change condition is satisfied, the progress control unit 331 may change the predetermined game region R to the restricted region Rt. In this case, in a case where the predetermined game-field change condition may be satisfied, the progress control unit 331 may change at least some of the game regions R to restricted regions Rt, and may create display data for displaying a game screen including a game field F which may include the changed game region R. The progress control unit 331 may transmit the created display data to the portable terminal 2. The restricted region Rt may be displayed so as to be visually recognizable or not to be visually recognizable. In a case where a region point may be correlated with the game region R which has been changed to the restricted region Rt, the correlated region point may be included in the owned point of a player who correlates the region point.

In a case where the above-described predetermined game-field change condition is satisfied, the progress control unit 331 may change the predetermined game region R to an undesignatable region Ro. The undesignatable region Ro may be a game region in which it may not be possible that a player correlates a region point, and a game region which does not function as the point-change target region. In a case where a region point may be correlated with a game region R which has been changed to the undesignatable region Ro, the correlated region point may be maintained without being changed. The region point correlated with the undesignatable region Ro may be used in the progress of the game (for example, determination of win or lose of the game), similarly to a region point correlated with a general game region R. An undesignatable period in which the predetermined game region R may be changed to the undesignatable region Ro may be set in the game system 1. In this case, if a predetermined undesignatable period elapses from when the predetermined game region R may be changed to the undesignatable region Ro, the undesignatable region Ro may be brought back into a game region R.

With the above descriptions, it may be possible to provide a game requiring further strategy from a player, in that a game region R on which play can occur may be selected and periodically updated, while the change of the game field F may be predicted. In addition, it may be possible to provide a game in which a player may be prevented, in advance, from associating a large amount of region points with a game region Rx, and in which an a stalemate may be unlikely to occur.

MODIFICATION EXAMPLE 3

In the embodiment, each of a plurality of players may be able to designate a game region R at any time during the operable period corresponding to the player. However, a period or a timing when a player can designate a game region R may not be limited to the operable period. For example, control may be performed such that a timing when a player can designate a game region R has a predetermined time interval, in a period from a start of the game to an end of the game. That is, a player can designate the next game region R after a predetermined time interval from a timing when at least some of the owned points of the player may be correlated with a game region R. In this case, the predetermined time interval may be changed in accordance with the size of the points value of region points associated with a game region R by the player. For example, control may be performed such that the predetermined time interval becomes longer as the value of the point which has been correlated as a region point, with a game region R by a player. Thus, it may be possible to cause region points which can be correlated with game regions R by each player to be uniform. In addition, an occurrence of a situation in which a player who has a large amount of the owned point may be too advantageous may be prevented, and thus it may be possible to maintain the will of a player to continue the game even when that player does not have a large amount of the owned points, to continue the game. It may be possible to provide a game in which considering the amount of a region point correlated with a game region R by a player and an operable period of the player, in accordance with an action of a player as the competition opponent may be required, and strategic characteristics may be required.

MODIFICATION EXAMPLE 4

The game system 1 may progress a game in which game regions included in the game field F may be respectively designated by a plurality of players and thus the game regions R may be correlated with groups to which the plurality of players belongs.

Figure 23:
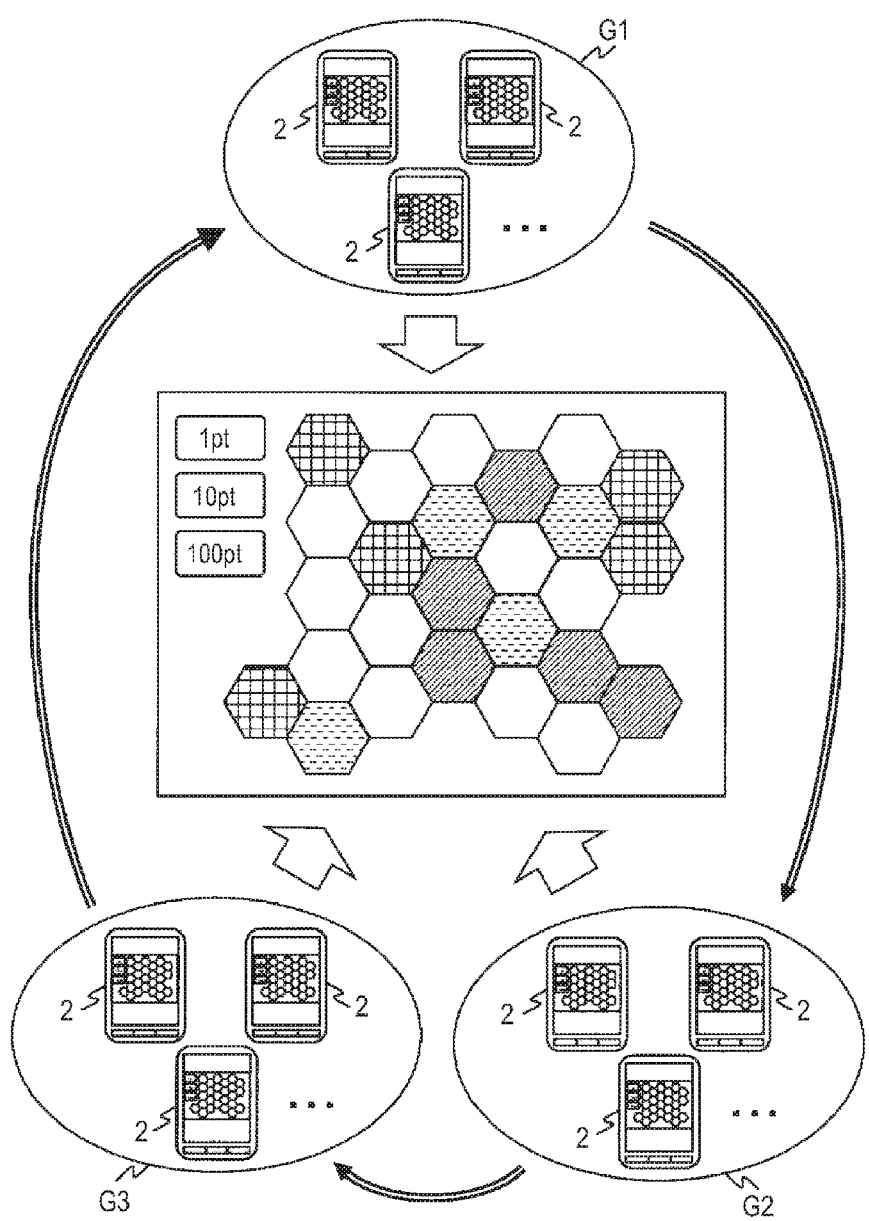
FIG. 23 is a diagram illustrating another example of the operation sequence of the game system.

FIG. 23 may be a diagram illustrating another example of the schematic configuration of the game system 1. As an example, a game in which a plurality of groups (group G1, group G2, and group G3) to which players participating in the game belong may be correlated with a game region R will be described below.

As illustrated in FIG. 23, a correlation game such as a domination game, in which a game field F including a plurality of game regions R may be displayed in portable terminals 2 of players who participate in the game and belong to a group G1, a group G2, and a group G3, and the displayed game field F may be used may proceed by the portable terminal 2 and the server 3 constituting the game system 1.

Each of a plurality of players participating in the game may designate a game region R included in the displayed game field F, in an input operation order. The input operation order may be correlated with the group. For example, in a case where the first in the input operation order may be the group G1, each of players belonging to the group G1 may designate a game region R in the operable period of the first in the input operation order. Similarly, in a case where the second in the input operation order may be the group G2, each of the players belonging to the group G2 may designate a game region R in the operable period of the second in the input operation order.

Then, the server 3 may receive input data from the portable terminal 2 of a player belonging to each group in the input operation order, when each operable period in the input operation order may be ended. Each group in the input operation order may be an example of a first group. The server 3 may calculate the summation value of region points correlated by players belonging to a group in each of a plurality of game regions R, and may correlate the calculated summation value of each of the game regions, as a game point of the group in each of the game regions.

The server 3 sets each of the plurality of game regions R, as a corresponding region of the group, which may be correlated with a region point of a value which may be the largest among region points correlated with the game region R.

The server 3 may specify another corresponding region Ra1 of the group, which has been previously set, and may be different from the corresponding region Ra2 of the group, which may be set this time in the input operation order. Then, the server 3 may determine whether or not one or a plurality of game regions R may be disposed between the corresponding region Ra2 of the group, which has been set, and the specified other corresponding region Ra1 of the group, in predetermined arrangement.

In a case where it may be determined that one or the plurality of game regions R may be disposed in the predetermined arrangement, the server 3 may determine whether or not all of the determined game regions R may be corresponding regions of another group which may be different from the group of this time in the input operation order. Then, in a case where it may be determined that all of the game regions R disposed in the predetermined arrangement may be the corresponding regions of another group, the server 3 may extract a region point of the group of this time in the input operation order, which may be correlated with the game region R disposed in the predetermined arrangement, and may extract a region point of another group which has the game region R disposed in the predetermined arrangement, as the corresponding region.

The server 3 may replace the extracted region point of the group of this time in the input operation order with the extracted region point of another group, and may store the region points replaced with each other.

In this manner, in a game in which the region-point changing processing may be performed, it may be possible to execute a competition between groups to which a plurality of players belongs, and to improve more interest for the game. Each player belonging to a group has a need to progress the game in cooperation with other players belonging to the group, and thus it may be possible to further promote cooperation in the group. In the embodiment and other modification examples, the region point and the corresponding region may be set for each group, and the region-point changing processing may be performed for each group.

A player belonging to each group may correlate a region point with a game region R, in accordance with an operation condition which has been set for each group. For example, the operation condition may correspond to a case where the summation of region points which can be correlated with a game region R by players belonging to each group, in each operable period, may be equal to or less than the predetermined first conditional value. Additionally or alternatively, the operation condition may correspond to a case where the summation of the number of game regions R which can be correlated with region points by players belonging to each group, in each operable period, may be equal to or less than the predetermined second conditional value.

For example, in a case where the first conditional value may be 1000 points, if the summation value of region points correlated by all players belonging to each group reaches 1000 points in the operable period of each group, it may not be possible that the player belonging to the group correlates a region point with a game region R until the next operable period. In a case where the second conditional value may be 50 pieces, if the summation value of the number of game regions R correlated by all players belonging to each group reaches 50 pieces in the operable period of each group, it may not be possible that the player belonging to the group correlates a region point with a game region R until the next operable period.

The operation condition may correspond to a case where the summation of region points which can be correlated with a game region R by players belonging to each group, for a period from a start of the game to an end of the game, may be equal to or less than a third predetermined conditional value. Additionally or alternatively, the operation condition may correspond to a case where the summation of the number of game regions R which can be correlated with a region point by a players belonging to each group for a period from a start of the game to an end of the game may be equal to or less than a fourth predetermined conditional value, and the like. The first conditional value, the second conditional value, the third conditional value, and the fourth conditional value may vary for each group.

Thus, each player belonging to a group has a need to progress the game in cooperation with other players belonging to the group, and thus it may be possible to further promote cooperation in the group.

MODIFICATION EXAMPLE 5

The progress control unit 331 in the server 3 may associate each player with a player reward in accordance with the region point correlated with a game region R by each player participating in the game. The player reward may be game content, an item, virtual currency, or the like which may be used in another game, another event, and the like.

For example, the progress control unit 331 may store a region point included in the input data transmitted by each player, in the server storage unit 32. When the game may be ended, the progress control unit 331 calculates the summation value of the region points of the player, which have been stored in the server storage unit 32. The player reward depending on the calculated summation value may be stored in the server storage unit 32 in association with each player. The summation value may be a summation value of region points for corresponding regions of each player when the game maybe ended.

The progress control unit 331 may associate the group reward with each player, in accordance with the region point correlated with the corresponding region of a group to which each of players participating in the game belongs. The group reward may be game content, an item, virtual currency, or the like which may be used in another game, another event, and the like. The group reward may be different from the player reward.

For example, when the game may be ended, the progress control unit 331 may calculate the summation value of the region points correlated with the corresponding regions of each player, which have been stored in the server storage unit 32, for each group. The group reward depending on the calculated summation value of the region points of each group may be stored in the server storage unit 32 in association with each player belonging to each group. The summation value may be a summation value of the region points correlated with the corresponding regions of a group to which each of the players belongs, or be a summation value of the region points of each group, which may be correlated with game regions R by each of the players participating in the game, in the middle of executing the game.

Thus, in a group competition in the correlation game such as a domination game, it may be possible to obtain a reward depending on an individual record or a reward depending on the degree of the group participating in the game, in addition to a competition result. Thus, it may be possible to further improve player interest in the game. Because each player participates in the game while simultaneously having to consider a strategy for improving an individual record and a strategy for improving a group record, players' interest may be held for longer and the game may be vitalized.

MODIFICATION EXAMPLE 6

The corresponding region R of a player may be displayed based on predetermined color information associated with the player. However, the predetermined color information may be changed in accordance with the region point of the player, which may be correlated with the corresponding region R, and the corresponding region R may be displayed based on the changed color information. For example, the progress control unit 331 in the server 3 may specify predetermined color information associated with a player. The progress control unit 331 changes brightness, chroma, or hue in the predetermined color information in accordance with the region point of the player, which may be correlated with the corresponding region R of the player. The progress control unit 331 may create display data for displaying a game screen including the game field F which may include the corresponding region R, based on the changed color information.

In the corresponding region R of a player, the predetermined color information associated with the player may be changed in accordance with the region point of another player, which may be correlated with the corresponding region R. The corresponding region R may be displayed based on the changed color information.

In the corresponding region R of a player, predetermined color information associated with the player may be changed in accordance with the region point of the player, which may be correlated with the corresponding region R and the region point of another player. The corresponding region R may be displayed based on the changed color information. For example, a relative point such as a different value between the region point of the player and the region point of another player may be calculated, and predetermined color information may be changed in accordance with the calculated relative point.

Thus, it may be possible to easily visually recognize a region point correlated with a corresponding region R by a player and/or other players, and to determine a game region which may be immediately correlated by the player.

In the portable terminal 2 held by a player, a corresponding region R of the player may be displayed based on first color information, and corresponding regions R of all other players except for the player may be displayed based on second color information. Thus, the player can immediately distinguish the own corresponding region R from corresponding regions R of other players except for the player. The portable terminal 2 held by a player may have a function of performing switching between display of a corresponding region based on color information associated with each of a plurality of players, and display of corresponding regions based on first color information for the player and second color information for all other players. Thus, it may be possible to display a corresponding region in a display form desired by a player.

MODIFICATION EXAMPLE 7

In a case where a predetermined period elapses from a start of the game, the progress control unit 331 in the server 3 may end the game. In a case where the summation value of region points correlated with a game region by players participating in the game exceeds a predetermined value, the progress control unit 331 may end the game.

Thus, the game may be ended at a timing which may not be expected by a player, and thus it may be possible to provide a game further requiring a strategy of a player.

MODIFICATION EXAMPLE 8

The above-described functions of the server processing unit 33 may be executed in the processing unit 25 in the portable terminal 2. In this case, if various tables may be stored in the storage unit 22, it may not be necessary that a communication with the server 3 may be performed every time processing may be performed, and the above functions can be realized only by the portable terminal 2. The game executed in the portable terminal 2 may be a hybrid-game in which the server 3 and the portable terminal 2 handle a portion of the processing. In this case, for example, web display and a native display may be provided. In the web display, the game screen relating to the progress of the game may be displayed in the portable terminal 2 based on display data generated by the server 3. In the native display, others of a menu screen and the like may be displayed by a native application which may be installed on the portable terminal 2.

MODIFICATION EXAMPLE 9

The game system 1 may have a configuration of including only a plurality of portable terminals 2 which may be respectively operated by a plurality of players. Each of the plurality of portable terminals 2 may perform wireless communication with other portable terminals 2 by a wireless communication scheme of the IEEE802.11 standards. The plurality of portable terminals 2 may constitute an ad hoc network. In this case, a specific portable terminal 2 among the plurality of portable terminals 2 may function as a host, and may execute the above-described functions of the server 3. A portable terminal 2 other than the specific portable terminal 2 among the plurality of portable terminals 2 may communicate with the specific portable terminal 2 that executes the functions of the server 3, and thus the above-described game may be executed. The specific portable terminal 2 functioning as the host may execute both of the functions of the server 3 and the functions of the portable terminal 2.

The skilled person of the related art can understand that various changes, substitutions, and modifications maybe added without departing from the gist and the scope of the present invention.

What is claimed is:

1. A non-transitory computer-readable storage medium comprising program code that, when executed, causes a game device including a storage unit to execute steps comprising progressing a game, the game comprising a game field including a plurality of game regions, wherein progressing a game comprises executing steps of:
storing, in the storage unit, a plurality of sets of points, each of the plurality of sets of points respectively associated with one of a plurality of players;
receiving a request of a first player in the plurality of players, and, in accordance with the request of the first player, correlating at least a portion of the set of points associated with the first player as region points of the first player, the region points associated with a first game region designated by the first player;
determining whether a value of the region points of the first player that are correlated with the first game region is larger than a value of region points of at least one player different from the first player that are correlated with the first game region, and, when the region points of the first player have a greater value than the region points of the at least one player different from the first player, setting the first game region to be a region of the first player;
when the first game region and a second game region, the first game region being a region newly set to be a region of the first player, and the second game region being a region set to be a region of the first player prior to the first game region having been set to be a region of the first player, are disposed in a predetermined arrangement, and when all of the one or more game regions disposed between the first game region and the second game region in the predetermined arrangement are regions of the at least one player different from the first player, performing the steps of:
for each game region in the one or more game regions disposed between the first game region and the second game region in the predetermined arrangement, extracting a region point value of the first player and a region point value of the at least one player different from the first player;
correlating the extracted region point value of the at least one player different from the first player as a region point value of the first player, and, when the region point value of the first player is larger than the region point value of the at least one player different from the first player, setting the game region in the one or more game regions disposed between the first game region and the second game region in the predetermined arrangement to be a region of the first player; and
correlating the extracted region point value of the first player as a region point value of the at least one player different from the first player.

2. The non-transitory computer-readable storage medium according to claim 1,
wherein the step of setting the first game region to be the region of the first player further comprises:
determining whether the first player has designated a predetermined point region from the plurality of game regions, the predetermined point region having a predetermined point value associated therewith; and
when the first player has designated a predetermined point region, consuming, from the set of points associated with the first player and stored in the storage unit, the predetermined point value and the region points correlated with the predetermined point region.

3. The non-transitory computer-readable storage medium according to claim 1,
wherein the game field includes a restricted region, and wherein the game is configured to prevent designation of the restricted region by a player in an initial state; and
further comprising the step of changing the restricted region to a game region, the step of changing the restricted region to the game region depending on the number of times at least a portion of the set of points associated with the first player have been correlated as region points of the first player, according to one or more requests of the first player.

4. The non-transitory computer-readable storage medium according to claim 1,
further comprising causing the game device to execute a process which includes
specifying color information associated with the first player in the region of the first player,
changing at least one of brightness, chroma, or hue of the specified color information, based on at least one of the region point of the first player and the region point of another player which is correlated with the region of the first player, and
displaying the region of the first player with the changed color information.

5. A non-transitory computer-readable storage medium comprising program code that, when executed, causes a game device including a storage unit to execute steps comprising progressing a game, the game comprising a game field including a plurality of game regions, wherein progressing a game comprises executing steps of:

storing, in the storage unit, a plurality of sets of points, each of the plurality of sets of points respectively associated with one of a plurality of players;

receiving a request of a first player in the plurality of players, and, in accordance with the request of the first player, associating at least a portion of the set of points associated with the first player as region points of the first player, the region points associated with a first game region designated by the first player;

determining whether a summation value of the region points of a plurality of players included in a first group, the plurality of players including the first player, that are correlated with the first game region is larger than a value of region points of at least one group different from the first group that are correlated with the first game region, and, when the region points of the first group have a greater value than the region points of the at least one group different from the first group, setting the first game region to be a region of the first group;

when the first game region and a second game region, the first game region being a region newly set to be a region of the first group, and the second game region being a region set to be a region of the first group prior to the first game region having been set to be a region of the first group, are disposed in a predetermined arrangement, and when all of the one or more game regions disposed between the first game region and the second game region in the predetermined arrangement are regions of the at least one group different from the first group, performing the steps of:

for each game region in the one or more game regions disposed between the first game region and the second game region in the predetermined arrangement, extracting a region point value of the first group and a region point value of the at least one group different from the first group;

correlating the extracted region point value of the at least one group different from the first group as a region point value of the first group, and, when the region point value of the first group is larger than the region point value of the at least one group different from the first group, setting the game region in the one or more game regions disposed between the first game region and the second game region in the predetermined arrangement to be a region of the first group; and correlating the extracted region point value of the first player as a region point value of the at least one player different from the first player.

6. The non-transitory computer-readable medium according to claim 5, further comprising causing the game device to execute a process which includes calculating a summation value of region points correlated by each player, for each of the plurality of players of the first group, storing, in the storage unit, for each of the plurality of players of the first group, a player reward associated with the player in the plurality of players, the player reward depending on the calculated summation value, and storing, in the storage unit, for each of the plurality of players in the first group, a group reward associated with the player in the plurality of players, the group reward depending on a summation value of region points of the first group, the region points of the first group correlated with one or more regions of the first group.

7. A control method which is configured to be executed by a game device which includes a processor, an input device, a display, and a storage unit and which is configured to progress a game by using a game field including a plurality of game regions, the method comprising:

storing, in the storage unit, a plurality of sets of points, each of the plurality of sets of points respectively associated with one of a plurality of players;

receiving a request of a first player in the plurality of players, and, in accordance with the request of the first player, correlated at least a portion of the set of points associated with the first player as region points of the first player, the region points correlated with a first game region designated by the first player;

determining whether a value of the region points of the first player that are correlated with the first game region is larger than a value of region points of at least one player different from the first player that are correlated with the first game region, and, when the region points of the first player have a greater value than the region points of the at least one player different from the first player, setting the first game region to be a region of the first player;

when the first game region and a second game region, the first game region being a region newly set to be a region of the first player, and the second game region being a region set to be a region of the first player prior to the first game region having been set to be a region of the first player, are disposed in a predetermined arrangement, and when all of the one or more game regions disposed between the first game region and the second game region in the predetermined arrangement are regions of the at least one player different from the first player, performing the steps of:

for each game region in the one or more game regions disposed between the first game region and the second game region in the predetermined arrangement, extracting a region point value of the first player and a region point value of the at least one player different from the first player;

correlating the extracted region point value of the at least one player different from the first player as a region point value of the first player, and, when the region point value of the first player is larger than the region point value of the at least one player different from the first player, setting the game region in the one or more game regions disposed between the first game region and the second game region in the predetermined arrangement to be a region of the first player; and correlating the extracted region point value of the first player as a region point value of the at least one player different from the first player.

8. A game device which is configured to progress a game by using a game field including a plurality of game regions, the device comprising:

a processor;

an input device;

a display;

a storage unit configured to store a plurality of sets of points which are respectively associated with a plurality of players;

a correlation unit configured to receive a request of a first player, and, in accordance with the request of the first player, correlate at least a portion of the set of points associated with a first player, as region points of the first player, with a designated game region designated by the first player among the plurality of game regions; and a setting unit configured to determine whether a value of the region points of the first player that are correlated with the first game region is larger than a value of region points of at least one player different from the first player that are correlated with the first game region, the setting unit further being configured to, when the region points of the first player have a greater value than the region points of the at least one player different from the first player, set the first game region to be a region of the first player;

wherein, when the first game region and a second game region, the first game region being a region newly set to be a region of the first player, and the second game region being a region set to be a region of the first player prior to the first game region having been set to be a region of the first player, are disposed in a predetermined arrangement, and when all of the one or more game regions disposed between the first game region and the second game region in the predetermined arrangement are regions of the at least one player different from the first player, the correlation unit is configured to, for each game region in the one or more game regions disposed between the first game region and the second game region in the predetermined arrangement, extract a region point value of the first player and a region point value of the at least one player different from the first player, correlate the extracted region point value of the at least one player different from the first player as a region point value of the first player, and correlate the extracted region point value of the first player as a region point value of the at least one player different from the first player; and the setting unit is configured to set the game region in the one or more game regions disposed between the first game region and the second game region in the predetermined arrangement to be a region of the first player.

* * * * *